United States Patent
Imafuji et al.

(10) Patent No.: US 8,639,111 B2
(45) Date of Patent: Jan. 28, 2014

(54) EXCHANGEABLE LENS

(71) Applicant: Nikon Corporation, Tokyo (JP)

(72) Inventors: Kazuharu Imafuji, Kawasaki (JP); Masafumi Oikawa, Mitaka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/622,711

(22) Filed: Sep. 19, 2012

(65) Prior Publication Data

US 2013/0077955 A1 Mar. 28, 2013

Related U.S. Application Data

(60) Provisional application No. 61/564,569, filed on Nov. 29, 2011.

(30) Foreign Application Priority Data

Sep. 20, 2011 (JP) ................................. 2011-205063
Aug. 31, 2012 (JP) ................................. 2012-191003

(51) Int. Cl.
*G03B 17/00* (2006.01)
(52) U.S. Cl.
USPC ........................................................ 396/532
(58) Field of Classification Search
USPC ........................................................ 396/532
See application file for complete search history.

(56) References Cited

U.S. PATENT DOCUMENTS

| | | | |
|---|---|---|---|
| 5,065,175 A | 11/1991 | Suzuki et al. | |
| 5,089,834 A | 2/1992 | Nakasa et al. | |
| 6,336,754 B1 | 1/2002 | Sato et al. | |
| 6,341,902 B1 * | 1/2002 | Sato et al. | ..................... 396/529 |
| 8,400,722 B2 | 3/2013 | Imafuji et al. | |
| 2009/0269049 A1 * | 10/2009 | Ueda et al. | ..................... 396/529 |
| 2010/0091175 A1 | 4/2010 | Shintani et al. | |
| 2011/0317062 A1 * | 12/2011 | Fujino et al. | ..................... 348/360 |
| 2012/0063020 A1 | 3/2012 | Imafuji et al. | |

(Continued)

FOREIGN PATENT DOCUMENTS

| | | |
|---|---|---|
| JP | A-07-234432 | 9/1995 |
| JP | A-09-211656 | 8/1997 |

(Continued)

OTHER PUBLICATIONS

Office Action issued in Japanese Patent Application No. 2012-191002 mailed Dec. 4, 2012 (with translation).

(Continued)

*Primary Examiner* — Clayton E Laballe
*Assistant Examiner* — Dennis Hancock
(74) *Attorney, Agent, or Firm* — Oliff & Berridge, PLC

(57) ABSTRACT

An exchangeable lens includes a holding portion where twelve lens connector terminals, each connected to one of the twelve body connector terminals and each having a contact area to come into contact with one of the body connector terminals, and at least one auxiliary lens terminal having a contact area are disposed therein so as to form a circular arc pattern relative to the amount center point. An interior angle formed by the contact area of the auxiliary lens terminal and the contact area of the eleventh lens connector terminal at the mount center point is smaller than an interior angle formed by the contact area of the first lens connector terminal and the contact area of the eleventh lens connector terminal at the mount center point.

7 Claims, 15 Drawing Sheets

(56) References Cited

U.S. PATENT DOCUMENTS

| | | |
|---|---|---|
| 2012/0195587 A1 | 8/2012 | Hasuda et al. |
| 2013/0071102 A1 | 3/2013 | Imafuji et al. |
| 2013/0077954 A1 | 3/2013 | Oikawa et al. |
| 2013/0077956 A1 | 3/2013 | Imafuji et al. |
| 2013/0077957 A1 | 3/2013 | Oikawa et al. |

FOREIGN PATENT DOCUMENTS

| | | |
|---|---|---|
| JP | A-2008-233773 | 10/2008 |
| JP | A-2010-288307 | 12/2010 |
| JP | A-2012-155290 | 8/2012 |

OTHER PUBLICATIONS

Office Action issued in Japanese Patent Application No. 2012-191003 mailed Dec. 4, 2012 (with translation).
Office Action issued in Japanese Patent Application No. 2012-191004 mailed Dec. 4, 2012 (with translation).
Office Action issued in Japanese Patent Application No. 2012-191005 mailed Dec. 4, 2012 (with translation).
Office Action issued in Japanese Patent Application No. 2012-191006 mailed Dec. 4, 2012 (with translation).
Office Action issued in Japanese Patent Application No. 2012-191007 mailed Dec. 4, 2012 (with translation).
U.S. Appl. No. 13/622,699 in the name of Imafuji et al., filed Sep. 19, 2012.
U.S. Appl. No. 13/622,787 in the name of Imafuji et al., filed Sep. 19, 2012.
U.S. Appl. No. 13/622,784 in the name of Oikawa et al., filed Sep. 19, 2012.
U.S. Appl. No. 13/622,828 in the name of Oikawa et al., filed Sep. 19, 2012.
May 3, 2013 Notice of Allowance issued in U.S. Appl. No. 13/622,787.
May 31, 2013 Supplemental Notice of Allowance issued in U.S. Appl. No. 13/622,787.
Jun. 7, 2013 Office Action issued in U.S. Appl. No. 13/622,784.
May 10, 2013 Office Action issued in U.S. Appl. No. 13/622,828.
Oct. 22, 2013 Office Action issued in U.S. Appl. No. 13/622,699.

* cited by examiner

EXCHANGEABLE LENS

This non-provisional application claims the benefit of U.S. Provisional Application No. 61/564,569 filed Nov. 29, 2011. This application also claims priority from Japanese Application No. 2011-205063 filed Sep. 20, 2011 and Japanese Application No. 2012-191003 filed Aug. 31, 2012. The disclosure of each of the earlier applications is herein incorporated by reference in its entirety.

BACKGROUND OF THE INVENTION

1. Field of the Invention

The present invention relates to an exchangeable lens.

2. Description of Related Art

The camera body in a camera system known in the related art may engage in electrical communication with an exchangeable lens. Japanese Laid Open Patent Publication No. H7-234432 discloses an exchangeable lens that includes a group of terminals enabling the exchangeable lens to communicate with the camera body and an adapter (e.g., an intermediate ring or a rear focus converter). The terminals in this terminal group are disposed next to one another so as to form a circular arc pattern, and another group of terminals, through which power is provided from the camera body to the exchangeable lens and the adapter, is disposed next to one end of the terminal group.

SUMMARY OF THE INVENTION

There is an issue yet to be effectively addressed with regard to the exchangeable lens disclosed in the publication cited above in that the exchangeable lens cannot be mounted smoothly.

An exchangeable lens according to a first aspect of the present invention comprises: a camera lens mount unit at which a camera body, with twelve body connector terminals disposed near a camera body mount unit at the camera body, is mounted, with the camera lens mount unit having a mount center point; a holding portion where twelve lens connector terminals, each connected to one of the twelve body connector terminals and each having a contact area to come into contact with one of the body connector terminals, and at least one auxiliary lens terminal having a contact area are disposed therein so as to form a circular arc pattern relative to the amount center point; an optical system that includes a drive target member which can be driven; and a drive unit that drives the drive target member, wherein: the twelve lens connector terminals are: a first lens connector terminal through which a drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals and the auxiliary lens terminal at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and an interior angle formed by the contact area of the auxiliary lens terminal and the contact area of the eleventh lens connector terminal at the mount center point is smaller than an interior angle formed by the contact area of the first lens connector terminal and the contact area of the eleventh lens connector terminal at the mount center point.

According to a second aspect of the present invention, in the exchangeable lens according to the first aspect, the auxiliary lens terminal may be a terminal that remains unconnected with any of the twelve body connector terminals.

According to a third aspect of the present invention, in the exchangeable lens according to the first or second aspect, the auxiliary lens terminal may be a terminal used for purposes of maintenance.

According to a fourth aspect of the present invention, in the exchangeable lens according to the first or second aspect, it is preferable that either a first camera body, which includes the twelve body connector terminals, or a second camera body, which further includes, in addition to the twelve body connector terminals, a second body terminal disposed near the camera body mount unit, can be mounted at the camera lens mount unit; and when the second camera body is mounted at the camera lens mount unit, the auxiliary lens terminal is connected with the second body terminal.

According to a fifth aspect of the present invention, in the exchangeable lens according to the first or second aspect, it is preferable that the camera body can be mounted at the camera lens mount unit via an intermediate adapter that includes an adapter terminal to be connected to the auxiliary lens terminal; and the exchangeable lens further comprises an adapter detection unit that detects, via the auxiliary lens terminal, presence/absence of the intermediate adapter.

According to a sixth aspect of the present invention, in the exchangeable lens according to any one of the first to fifth aspects, the auxiliary lens terminal may assume a shape substantially identical to at least one lens connector terminal among the twelve lens connector terminals.

According to a seventh aspect of the present invention, in the exchangeable lens according to any one of the first to sixth aspects, it is preferable that the twelve lens connector terminals and the auxiliary lens terminal each include an exposed area that is exposed at a surface of the holding portion.

BRIEF DESCRIPTION OF THE DRAWINGS

FIGS. 5A and 513 each show a camera lens mount unit in a front view.

FIGS. 13A and 1313 each show a holding portion achieved in a fourth embodiment in a front view.

FIGS. 14A and 1413 show the eighth lens connector terminal LP8 in the fourth embodiment in a front view and a sectional view respectively.

DESCRIPTION OF PREFERRED EMBODIMENTS

First Embodiment

Figure 1:
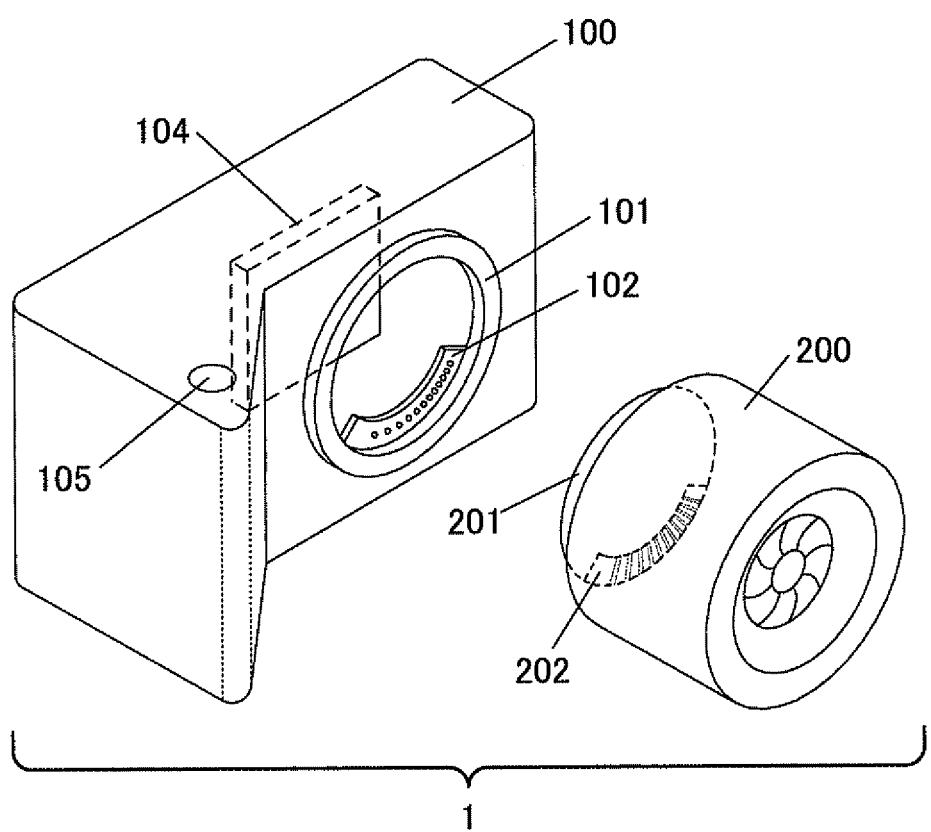
FIG. 1 is a perspective of a camera system compatible with exchangeable lenses, in which a first embodiment of the present invention is adopted.

FIG. 1 is a perspective of a camera system compatible with exchangeable lenses, achieved in the first embodiment of the present invention. It is to be noted that FIG. 1 only shows the units and devices relevant to the present invention and that an illustration and an explanation of other units and devices are not provided. A camera system 1 comprises a camera body 100 and an exchangeable lens (photographic lens) 200 that can be detachably mounted at the camera body 100.

The camera body 100 includes a camera body mount unit 101 adopting a bayonet structure, at which the exchangeable lens 200 is detachably mounted. A holding portion (electrical connector portion) 102, projecting out on the inner circumferential side of the camera body mount unit 101 over part of the inner circumference, with twelve body connector terminals held thereat, is disposed in an area near the camera body mount unit 101 (on the inner circumferential side of the camera body mount unit 101).

In addition, a camera lens mount unit 201, corresponding to the camera body mount unit 101, at which the camera body 100 is detachably mounted, is disposed at the exchangeable lens 200. A holding portion (electrical connector portion) 202, projecting out on the inner circumferential side of the camera lens mount unit 201 over part of the inner circumference, with twelve lens connector terminals and a single auxiliary lens terminal held thereat, is disposed in an area near the camera lens mount unit 201 (on the inner circumferential side of the camera lens mount unit 201).

The center of an opening at the camera body mount unit 101 must be aligned with the optical axis of the exchangeable lens 200, and an index mark (not shown) at the exchangeable lens 200, indicating the rotational position of the exchangeable lens 200, must be aligned with a similar index mark at the camera body 100 to allow the camera lens mount unit 201 to be inserted at the camera body mount unit 101. Then, as the exchangeable lens 200 is rotated along the counterclockwise direction viewed from the front of the camera body 100, tabs at the camera lens mount unit 201 move into the space behind tabs at the camera body mount unit 101. When the exchangeable lens 200 is rotated by a predetermined angle, the camera lens mount unit 201 becomes coupled with the camera body mount unit 101 (the lens-side tabs and the body-side tabs become completely interlocked with each other) and thus, the exchangeable lens 200 becomes completely engaged with the camera body.

As the exchangeable lens 200 is engaged with the camera body 100, the plurality of body connector terminals held at the holding portion 102 (to be described in detail later) become electrically and physically connected with the plurality of lens connector terminals held at the holding portion 202 (to be described in detail later). These terminals are used to provide power from the camera body 100 to the exchangeable lens 200 and to exchange signals between the camera body 100 and the exchangeable lens 200. It is to be noted that the auxiliary lens terminal at the holding portion 202 of the exchangeable lens 200 remains unconnected with any of the terminals at the holding portion 102 of the camera body 100, as will be described in detail later.

An image sensor 104 is disposed inside the camera body 100 at a position rearward relative to the camera body mount unit 101. A button 105, functioning as an input device, is disposed on the top side of the camera body 100. The user is able to issue a photographing instruction, a photographing condition setting instruction or the like to the camera body 100 by operating an input device such as the button 105.

Figure 2:
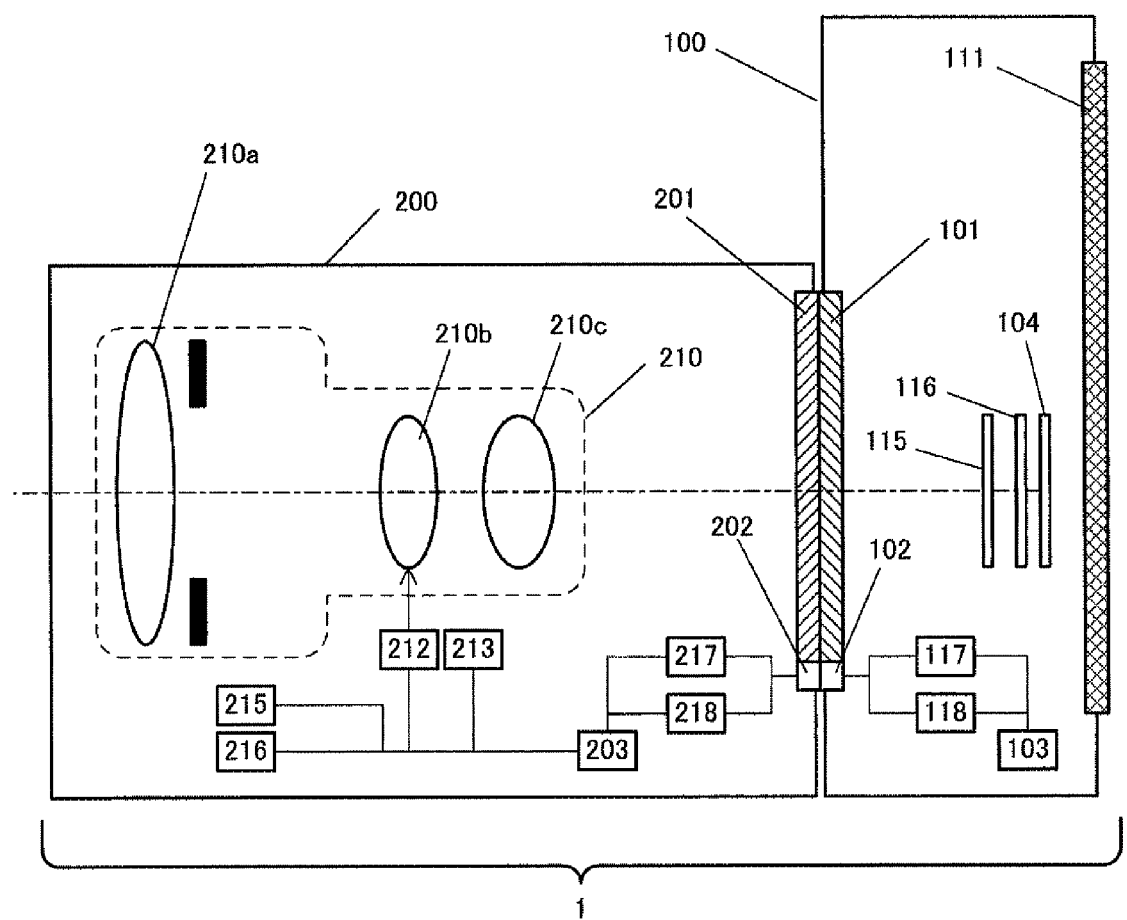
FIG. 2 is a sectional view of the camera system compatible with exchangeable lenses, in which the first embodiment of the present invention is adopted.

FIG. 2 is a sectional view of the camera system 1 compatible with exchangeable lenses according to the present invention. The exchangeable lens 200 includes an image forming optical system 210 via which a subject image is formed. The image forming optical system 210 is constituted with a plurality of lenses 210a through 210c. The plurality of lenses 210a through 210c includes a focusing lens 210b.

A lens control unit 203, which controls the various components constituting the exchangeable lens 200, is disposed inside the exchangeable lens 200. The lens control unit 203 is constituted with a microcomputer, its peripheral circuits and the like (none shown). A first lens-side communication unit 217, a second lens-side communication unit 218, a lens drive unit 212, a lens position detection unit 213, a ROM 215 and a RAM 216 are connected to the lens control unit 203.

The first lens-side communication unit 217 and the second lens-side communication unit 218 exchange data with the camera body 100 via terminals at the holding portions 102 and 202. The first lens-side communication unit 217 and the second lens-side communication unit 218 each function as a communication interface for the exchangeable lens 200. The lens control unit 203 engages in various types of communication (hotline communication and command data communication) with the camera body 100 (with a body control unit 103 to be described in detail later) via these communication interfaces, as will be explained later.

The lens drive unit 212, which includes an actuator such as a stepping motor, drives the focusing lens 210b in response to a signal input to the lens drive unit 212. The lens position detection unit 213 detects the position of the focusing lens 210b by, for instance, counting the number of signal pulses input to the stepping motor in the lens drive unit 212. It may instead detect the position of the focusing lens 210b via a distance encoder or the like of the known art disposed at the exchangeable lens 200.

It is to be noted that a drive target member other than the focusing lens 210b described above may be disposed in the exchangeable lens 200. For instance, if a zoom lens which is allowed to move along the optical axis of the exchangeable lens 200 (the image forming optical system 210), as is the focusing lens 210b, is provided, a mechanism (widely known as a power zoom mechanism) that electrically drives the zoom lens may be included in the exchangeable lens 200. In addition, a blur correction mechanism equipped with a blur correction lens, movable along directions that include directional components (X and Y direction components) perpendicular to the optical axis of the image forming optical system 210, which corrects image blur by driving the blur correction lens, may be disposed in the exchangeable lens 200. Furthermore, an aperture drive mechanism for controlling drive of an aperture member (aperture blades) that can be moved so as to alter the size of an aperture opening, through which a subject light flux passes, may be disposed in the exchangeable lens 200. The lens control unit 203 in an exchangeable lens that includes such drive target members controls the drive and the position detection executed for the individual drive target members, i.e., the blur correction lens, the aperture member and the zoom lens, via the lens drive unit 212 and the lens position detection unit 213.

The ROM 215 is a nonvolatile storage medium into which a specific control program, to be executed by the lens control unit 203, and the like are stored in advance. The RAM 216 is a volatile storage medium used by the lens control unit 203 as a storage area where various types of data are stored.

A shutter 115, via which the exposure conditions at the image sensor 104 are controlled, and an optical filter 116, which is an integrated filter achieved by combining an optical low pass filter and an infrared cut-off filter, are disposed in front of the image sensor 104. The subject light having been transmitted through the image forming optical system 210 enters the image sensor 104 via the shutter 115 and the filter 116.

The body control unit 103, engaged in control of the various components of the camera body 100, is disposed inside the camera body 100. The body control unit 103 is constituted with a microcomputer, a RAM, peripheral circuits and the like (none shown).

A first body-side communication unit 117 and a second body-side communication unit 118 are connected to the body control unit 103. The first body-side communication unit 117 is connected to the holding portion 102 and is able to exchange data with the first lens-side communication unit 217. The second body-side communication unit 118 is likewise able to exchange data with the second lens-side communication unit 218. Namely, the first body-side communication unit 117 and the second body-side communication unit 118 each function as a body-side communication interface. The body control unit 103 engages in various types of communication (hotline communication and command data communication) with the exchangeable lens 200 (with the lens control unit 203) via these communication interfaces, as will be explained later.

A display device 111 constituted with an LCD panel or the like is disposed at the rear surface of the camera body 100. The body control unit 103 brings up on display at the display device 111 a subject image (referred to as a live view image) based upon an output from the image sensor 104 or various types of menu screens enabling selection of photographing conditions and the like.

(Description of the Holding Portions 102 and 202)

Figure 3:
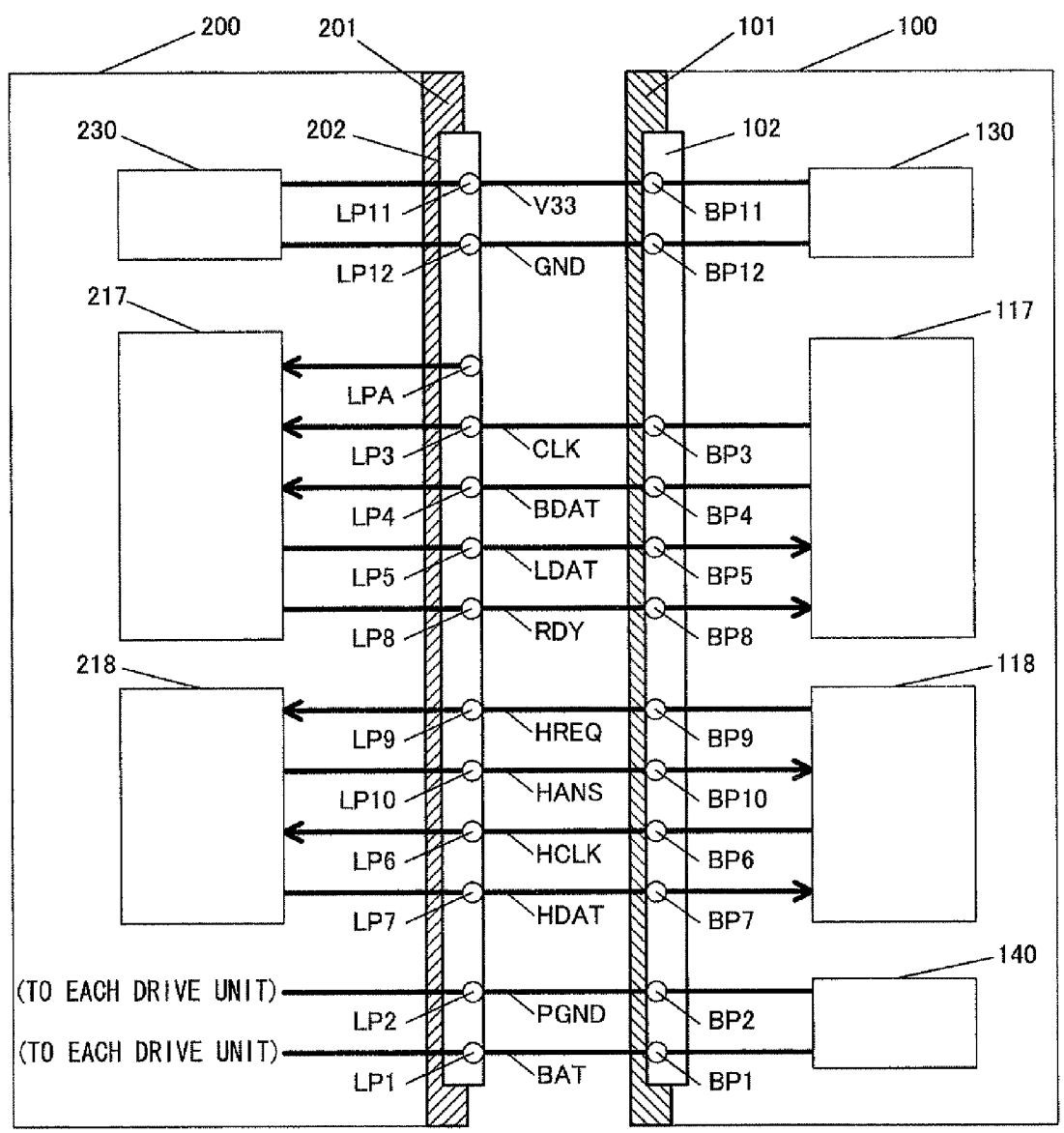
FIG. 3 is a schematic diagram showing in detail holding portions.

FIG. 3 is a schematic diagram showing structural details of the holding portions 102 and 202. As shown in FIG. 3, twelve body connector terminals BP1 through BP12 are present at the holding portion 102. In addition, twelve lens connector terminals LP1 through LP12, each corresponding to one of the twelve body connector terminals, and an auxiliary lens terminal LPA that does not correspond to any body connector terminal at the holding portion 102, are present at the holding portion 202.

The eleventh body connector terminal BP11 and the twelfth body connector terminal BP12 are connected to a first power supply circuit 130 located in the camera body 100. The first power supply circuit 130 provides an operating voltage to the eleventh body connector terminal BP11, via which the operating voltage is supplied to various components disposed in the exchangeable lens 200 except for the lens drive unit 212. In other words, an operating voltage, on which the various components in the exchangeable lens 200 (including the first lens-side communication unit 217 and the second lens-side communication unit 218) except for the lens drive unit 212 operate, is provided via the eleventh body connector terminal BP11 and the eleventh lens connector terminal LP11. While a specific range (e.g., a voltage range from 3 to 4 v), defined by a minimum voltage value and a maximum voltage value, is assumed for the voltage value representing the level of voltage that can be provided to the eleventh body connector terminal BP11, the voltage value of the voltage typically provided to the eleventh body connector terminal BP11 is close to the median of the maximum voltage value and the minimum voltage value. The value of the electric current provided from the camera body 100 to the exchangeable lens 200 in conjunction with the operating voltage will be in the range of approximately several tens of mA to several hundreds of mA in a power ON state.

The twelfth body connector terminal BP12 is a ground terminal that corresponds to the operating voltage provided to the eleventh body connector terminal BP11. Namely, the twelfth body connector terminal BP12 and the twelfth lens connector terminal LP12 are ground terminals that correspond to the operating voltage.

In the following description, the signal line formed with the eleventh body connector terminal BP11 and the eleventh lens connector terminal LP11 will be referred to as a signal line V33. The signal line formed with the twelfth body connector terminal BP12 and the twelfth lens connector terminal LP12 will be referred to as a signal line GND. The eleventh lens connector terminal LP11, the twelfth lens connector terminal LP12, the eleventh body connector terminal BP11 and the twelfth body connector terminal BP12 are power supply system connector terminals used to provide power from the camera body 100 to the exchangeable lens 200.

The third body connector terminal BP3, the fourth body connector terminal BP4, the fifth body connector terminal BP5 and the eighth body connector terminal BP8 are connected to the first body-side communication unit 117. The third lens connector terminal LP3, the fourth lens connector terminal LP4, the fifth lens connector terminal LP5 and the eighth lens connector terminal LP8 at the exchangeable lens 200, corresponding to the body connector terminals BP3, BP4, BP5 and BP8, are connected to the first lens-side communication unit 217. The first body-side communication unit 117 and the first lens-side communication unit 217 exchange data with each other via these terminals (communication system terminals). The communication carried out by the first body-side communication unit 117 and the first lens-side communication unit 217 will be described in detail later.

It is to be noted that the signal line formed with the third body connector terminal BP3 and the third lens connector terminal LP3 will be referred to as a signal line CLK in the following description. In addition, the signal line formed with the fourth body connector terminal BP4 and the fourth lens connector terminal LP4 will be referred to as a signal line BDAT, the signal line formed with the fifth body connector terminal BP5 and the fifth lens connector terminal LP5 will be referred to as a signal line LDAT and the signal line formed with the eighth body connector terminal BP8 and the eighth lens connector terminal LP8 will be referred to as a signal line RDY.

The first lens-side communication unit 217 is also connected with the auxiliary lens terminal LPA as well as to the various lens connector terminals listed above. The auxiliary lens terminal LPA is pulled up via a pull-up resistor (not shown) so as to achieve a predetermined voltage within the exchangeable lens 200. While the exchangeable lens 200 is engaged with the camera body 100, the auxiliary lens connector LPA remains unconnected with any of the terminals at the camera body 100 and, as a result, the source voltage is continuously applied to an input terminal at the first lens-side communication unit 217, which corresponds to the auxiliary lens terminal LPA.

The ninth body connector terminal BP9, the tenth body connector terminal BP10, the sixth body connector terminal BP6 and the seventh body connector terminal BP7 are connected to the second body-side communication unit 118. The ninth lens connector terminal LP9, the tenth lens connector terminal LP10, the sixth lens connector terminal LP6 and the seventh lens connector terminal LP7 at the exchangeable lens 200, corresponding to these body connector terminals, are connected to the second lens-side communication unit 218. The second lens-side communication unit 218 transmits data to the second body-side communication unit 118 via these terminals (communication system terminals). The communication carried out by the second body-side communication unit 118 and the second lens-side communication unit 218 will be described in detail later.

It is to be noted that the signal line formed with the ninth body connector terminal BP9 and the ninth lens connector terminal LP9 will be referred to as a signal line HREQ in the following description. In addition, the signal line formed with the tenth body connector terminal BP10 and the tenth lens connector terminal LP10 will be referred to as a signal line HANS, the signal line formed with the sixth body connector terminal BP6 and the sixth lens connector terminal LP6 will be referred to as a signal line HCLK and the signal line formed with the seventh body connector terminal BP7 and the seventh lens connector terminal LP7 will be referred to as a signal line HDAT.

The first body connector terminal BP1 and the second body connector terminal BP2 are connected to a second power supply circuit 140 located in the camera body 100. The second power supply circuit 140 provides a drive voltage, to be used to drive the lens drive unit 212, to the first body connector terminal BP1. In other words, the drive voltage for the lens drive unit 212 is provided via the first body connector terminal BP1 and the first lens connector terminal LP1. While the voltage value indicating the level of voltage that can be provided to the first body connector terminal BP1 assumes a range defined by a minimum voltage value and a maximum voltage value, the voltage value is never smaller than the voltage value indicating the level of voltage that can be provided to the eleventh body connector terminal BP11 assuming its own specific voltage value range as has been explained earlier. For instance, the maximum voltage value indicating the highest level of voltage that can be provided to the first body connector terminal BP1 may be several times the maximum voltage value indicating the highest level of voltage that can be supplied to the eleventh body connector terminal BP11. In other words, the voltage value indicating the level of voltage provided to the first body connector terminal BP1 is always different from the voltage value indicating the level of voltage provided to the eleventh body connector terminal BP11. It is to be noted that the voltage value indicating the level of voltage provided to the first body connector terminal BP1 under normal circumstances is close to the median of the maximum voltage value and the minimum voltage value assumed for the first body connector terminal BP1. The value of the electric current provided from the camera body 100 to the exchangeable lens 200 in conjunction with the drive voltage will be in the range of approximately several tens of mA to several A in the power ON state.

The second body connector terminal BP2 is a ground terminal that corresponds to the drive voltage provided to the first body connector terminal BP1. Namely, the second body connector terminal BP2 and the second lens connector terminal LP2 are ground terminals that correspond to the drive voltage.

In the following description, the signal line formed with the first body connector terminal BP1 and the first lens connector terminal LP1 will be referred to as a signal line BAT. The signal line formed with the second body connector terminal BP2 and the second lens connector terminal LP2 will be referred to as a signal line PGND. The first body connector terminal BP1, the first lens connector terminal LP1, the second body connector terminal BP2 and the second lens connector terminal LP2 are power supply system terminals used to provide power from the camera body 100 to the exchangeable lens 200.

It is to be noted that as the varying ranges assumed for the voltage value (current value) indicating the level of voltage provided via the first body connector terminal BP1 and the first lens connector terminal LP1 and for the voltage value (current value) indicating the level of voltage provided via the eleventh body connector terminal BP11 and the eleventh lens connector terminal LP11 clearly indicate, the difference between the maximum value and the minimum value taken for the electric current flowing through the second body connector terminal BP2 and the second lens connector terminal LP2, i.e., through the ground terminals corresponding to the voltage provided through the connector terminals BP1 and LP1, is greater than the difference between the maximum value and the minimum value taken for the electric current flowing through the twelfth body connector terminal BP12 and the twelfth lens connector terminal LP12, i.e., the ground terminals corresponding to the voltage provided through the connector terminals BP11 and LP11. A greater difference is assumed between the maximum value and the minimum value taken for the electric current flowing through the connector terminals BP2 and LP2, since greater power is used in the lens drive unit 212 equipped with a drive system such as an actuator, compared to the power used in the electronic circuits, e.g., the lens control unit 203, in the exchangeable lens 200 and also, the lens drive unit 212 does not use any power at all if it does not need to drive the focusing lens 210b.

Figure 4A:
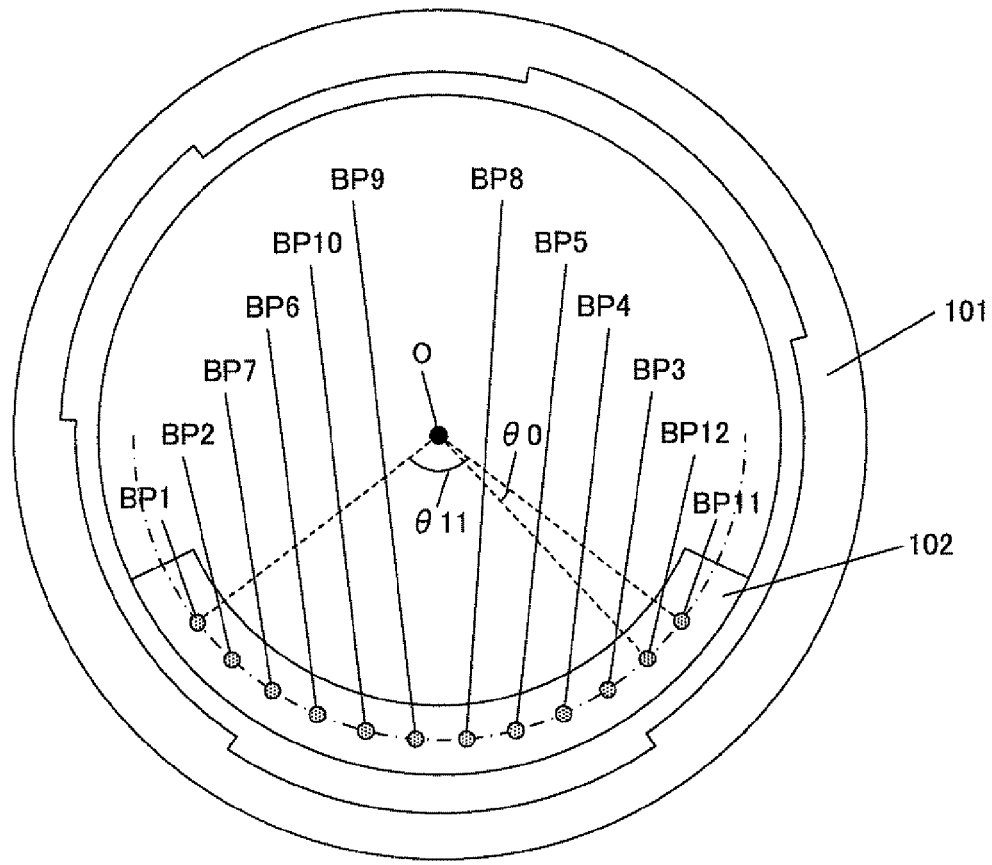
FIGS. 4A and 4B each show a camera body mount unit in a front view.
Figure 4B:
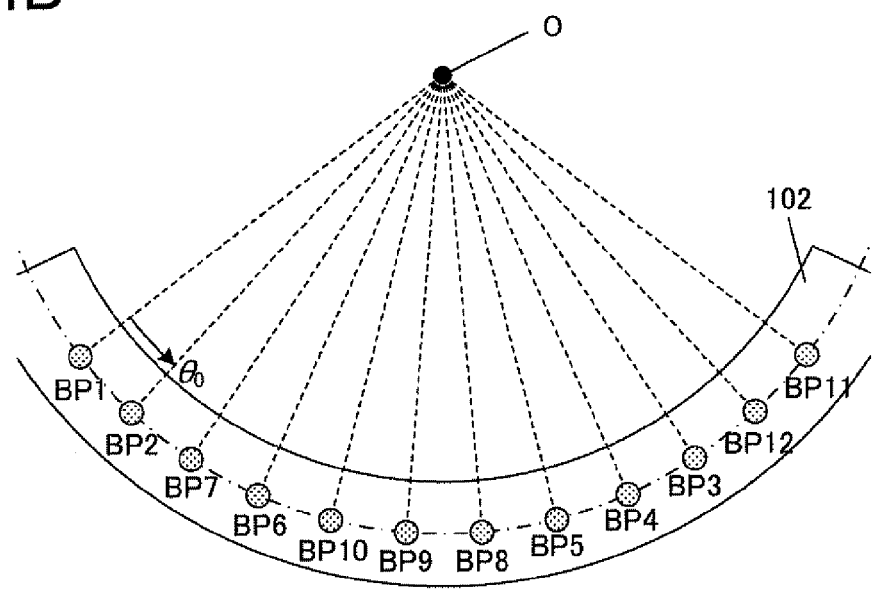
Figure 5A:
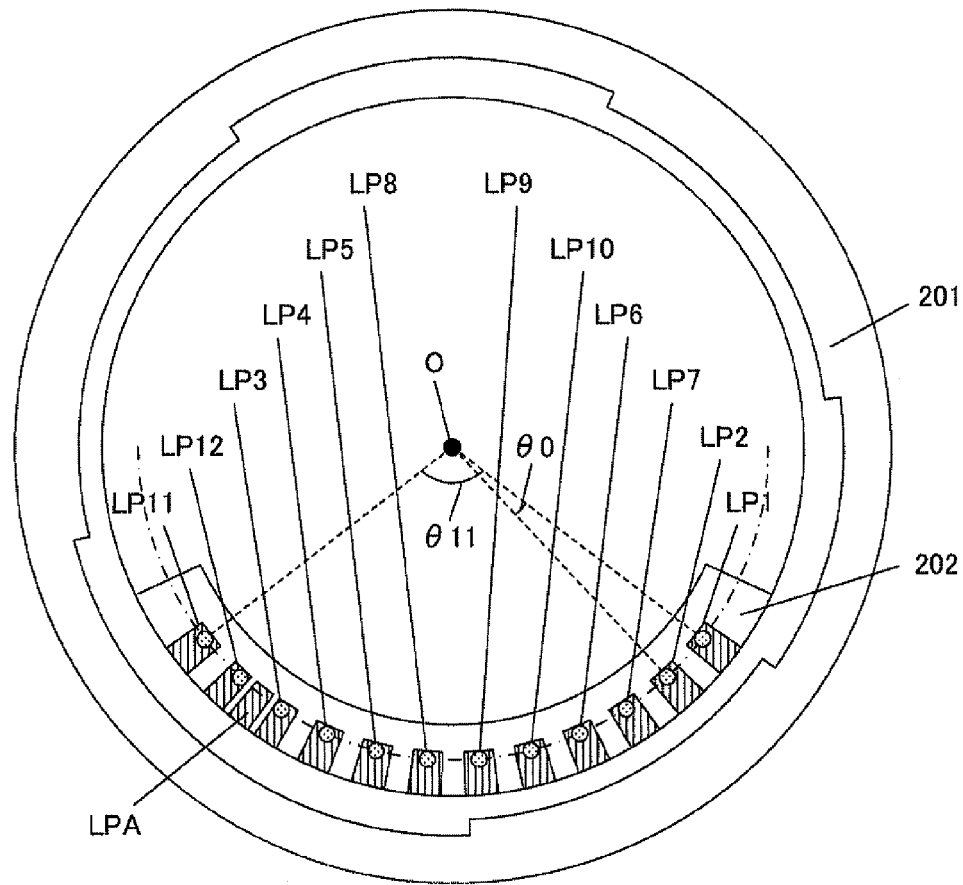
Figure 5B:
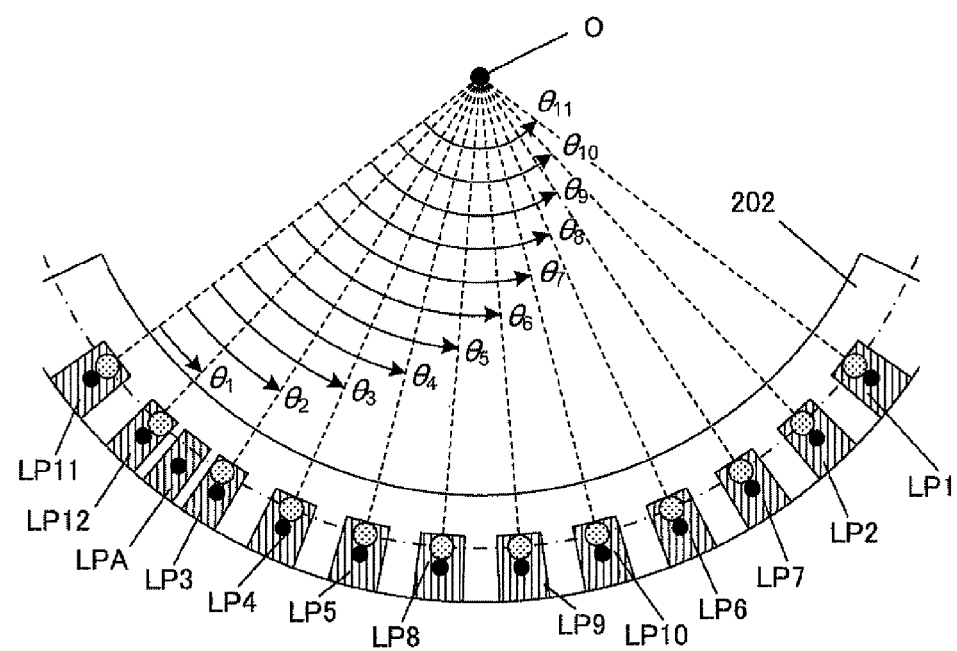

FIGS. 4A and 4B show the camera body mount unit 101 in front views. FIG. 4A shows the camera body mount unit 101 at the camera body 100 viewed from the side where the exchangeable lens 200 is mounted, whereas FIG. 4B shows the holding portion 102 in FIG. 4A in an enlargement. FIGS. 5A and 5B show the camera lens mount unit 201 in front views. FIG. 5A shows the camera lens mount unit 201 at the exchangeable lens 200 viewed from the side where the camera body 100 is mounted, whereas FIG. 5B shows the holding portion 202 in FIG. 5A in an enlargement. The mount units each assume a circular shape and the center of the circle will be referred to as a mount center point O in the following description.

As shown in FIG. 4A, the holding portion 102 is disposed at a position inward relative to the mount surface of the camera body mount unit 101 (deeper into the drawing sheet on which FIG. 4A is provided). In addition, FIG. 5A indicates that the holding portion 202 is disposed at a position outward relative to the mount surface of the camera lens mount unit 201 (toward the person viewing FIG. 5A). As the exchangeable lens 200 is mounted at the camera body 100 by engaging the camera body mount unit 101 with the camera lens mount unit 201 through the procedure described earlier, the holding portion 102 and the holding portion 202 become connected with each other. Once the holding portions 102 and 202 are thus connected, the twelve body connector terminals BP1 through BP12 and the twelve lens connector terminals LP1 through LP12 disposed at the two holding portions become connected with each other. The one-point chain lines, drawn over the twelve body connector terminals BP1 through BP12 and the twelve lens connector terminals LP1 through LP12 in FIGS. 4A and 4B and FIGS. 5A and 5B, indicate a locus through which the twelve body connector terminals BP1 through BP12 move when the camera body 100 is coupled with the exchangeable lens 200. Since this mount structure is of the known art, a further explanation is not provided.

As shown in FIG. 4A, the twelve body connector terminals BP1 through BP12 each assume a cylindrical shape and a force imparted from a spring or the like disposed inside the holding portion 102 presses them toward the front of the camera body mount unit 101 (toward the exchangeable lens 200). In addition, as shown in FIG. 5A, the twelve lens connector terminals LP1 through LP12 and the single auxiliary lens terminal LPA each include a substantially rectangular conductor exposed at the surface of the holding portion 202. Once the holding portion 102 is connected with the holding portion 202, the body connector terminals are each pressed against a lens connector terminal by the force imparted from the spring or the like as described above and thus, electrical continuity is achieved between the lens connector terminals and the body connector terminals. It is to be noted that the circles drawn over the twelve lens connector terminals LP1 through LP12 in FIG. 5A and FIG. 5B indicate the positions at which the corresponding body connector terminals are pressed against them.

In the following description, the particular area of each of the twelve lens connector terminals LP1 through LP12 and the auxiliary lens connector LPA that comes into contact with the corresponding body connector terminal when the camera body 100 and the exchangeable lens 200 are engaged with each other will be referred to as a contact area (an area indicated by each of the circles in FIG. 5A). In addition, the phrase "when the camera body 100 and the exchangeable lens 200 are engaged with each other" is used to refer to a state in which a voltage is supplied from the eleventh body connector terminal BP11 to the eleventh lens connector terminal LP11. It is to be noted that the term "lens connector terminal" or "auxiliary lens terminal" used in the description of the embodiment refers to an entire terminal that includes an electrical wiring (a lead wire, a flexible cable or the like) used to connect the substantially rectangular area (which includes the contact area) exposed at the surface of the holding portion 202, indicated as a shaded area in FIG. 5A, with the first lens-side communication unit 217 or the second lens-side communication unit 218, as well as the rectangular area itself. In addition, the areas of the lens connector terminals LP1 through LP12 and the auxiliary lens connector LPA exposed at the surface of the holding portion 202, indicated as the shaded areas as explained above, may be referred to as "exposed areas" of the lens connector terminals LP1 through LP12 and the auxiliary lens connector LPA in the following description. The expression "the center of a lens connector terminal" used in the following description refers to the center of the exposed area of the particular lens connector terminal, indicated as a filled circle in FIG. 5B. It is to be noted that the exposed areas will be described later in detail in reference to FIGS. 14A and 14B.

As shown in FIG. 5A, the twelve lens connector terminals LP1 through LP12 (the exposed areas of the twelve lens connector terminals) and the auxiliary lens connector terminal LPA (its exposed area) are set in the holding portion 202 of the camera lens mount unit 201 so as to form a circular arc centered on the mount center point O and ranging along the camera lens mount unit 201 (along part of the camera lens mount unit 201 assuming a substantially circular shape on the outside).

Next, in reference to FIG. 5B, the positional relationship among the twelve lens connector terminals LP1 through LP12 (their exposed areas) will be described. The interior angle θ11, formed by the contact area of the first lens connector terminal LP1 and the contact area of the eleventh lens connector terminal LP11 at the mount center point O, is the largest among interior angles, each formed by the contact areas of any two randomly selected lens connector terminals among the twelve lens connector terminals LP1 through LP12 at the mount center point O.

An interior angle θ1, formed by the contact area of the eleventh lens connector terminal LP11 and the contact area of the twelfth lens connector terminal LP12 at the mount center point O, is smaller than interior angles θ2 through θ11 each formed by the contact area of a given lens connector terminal among the first lens connector terminal LP1 through the tenth lens connector terminal LP10 and the contact area of the eleventh lens connector terminal LP11 at the mount center point O. The interior angle θ2, formed by the contact area of the third lens connector terminal LP3 and the contact area of the eleventh lens connector terminal LP11 at the mount center point O, is smaller than the interior angles θ3 through θ11 each formed by the contact area of a given lens connector terminal among the first lens connector terminal LP1, the second lens connector terminal LP2 and the fourth lens connector terminal LP4 through the tenth lens connector terminal LP10 and the contact area of the eleventh lens connector terminal LP11 at the mount center point O.

The interior angle θ3, formed by the contact area of the fourth lens connector terminal LP4 and the contact area of the eleventh lens connector terminal LP11 at the mount center point O, is smaller than the interior angles θ4 through θ11 each formed by the contact area of a given lens connector terminal among the first lens connector terminal LP1, the second lens connector terminal LP2 and the fifth lens connector terminal LP5 through the tenth lens connector terminal LP10 and the contact area of the eleventh lens connector terminal LP11 at the mount center point O. The interior angle θ4, formed by the contact area of the fifth lens connector terminal LP5 and the contact area of the eleventh lens connector terminal LP11 at the mount center point O, is smaller than the interior angles θ5 through θ11 each formed by the contact area of a given lens connector terminal among the first lens connector terminal LP1, the second lens connector terminal LP2 and the sixth lens connector terminal LP6 through the tenth lens connector terminal LP10 and the contact area of the eleventh lens connector terminal LP11 at the mount center point O.

The interior angle θ5, formed by the contact area of the eighth lens connector terminal LP8 and the contact area of the eleventh lens connector terminal LP11 at the mount center point O, is smaller than the interior angles θ6 through θ11 each formed by the contact area of a given lens connector terminal among the first lens connector terminal LP1, the second lens connector terminal LP2, the sixth lens connector terminal LP6, the seventh lens connector terminal LP7, the ninth lens connector terminal LP9 and the tenth lens connector terminal LP10 and the contact area of the eleventh lens connector terminal LP11 at the mount center point O. The interior angle θ6, formed by the contact area of the ninth lens connector terminal LP9 and the contact area of the eleventh lens connector terminal LP11 at the mount center point O, is smaller than the interior angles θ7 through θ11 each formed by the contact area of a given lens connector terminal among the first lens connector terminal LP1, the second lens connector terminal LP2, the sixth lens connector terminal LP6, the seventh lens connector terminal LP7 and the tenth lens connector terminal LP10 and the contact area of the eleventh lens connector terminal LP11 at the mount center point O.

The interior angle θ7, formed by the contact area of the tenth lens connector terminal LP10 and the contact area of the eleventh lens connector terminal LP11 at the mount center point O, is smaller than the interior angles θ8 through θ11 each formed by the contact area of a given lens connector terminal among the first lens connector terminal LP1, the second lens connector terminal LP2, the sixth lens connector terminal LP6 and the seventh lens connector terminal LP7 and the contact area of the eleventh lens connector terminal LP11 at the mount center point O. The interior angle θ8, formed by the contact area of the sixth lens connector terminal LP6 and the contact area of the eleventh lens connector terminal LP11 at the mount center point O, is smaller than the interior angles θ9 through θ11 each formed by the contact area of a given lens connector terminal among the first lens connector terminal LP1, the second lens connector terminal LP2 and the seventh lens connector terminal LP7 and the contact area of the eleventh lens connector terminal LP11 at the mount center point O.

The interior angle θ9, formed by the contact area of the seventh lens connector terminal LP7 and the contact area of the eleventh lens connector terminal LP11 at the mount center point O, is smaller than the interior angles θ10 and θ11 each formed by the contact area of either the first lens connector terminal LP1 or the second lens connector terminal LP2 and the contact area of the eleventh lens connector terminal LP11 at the mount center point O. The interior angle θ10, formed by the contact area of the second lens connector terminal LP2 and the contact area of the eleventh lens connector terminal LP11 at the mount center point O, is smaller than the interior angle θ11 formed by the contact area of the first lens connector terminal LP1 and the contact area of the eleventh lens connector terminal LP11 at the mount center point O.

The twelve lens connector terminals LP1 through LP12 (their exposed areas) are disposed at the holding portion 202 so as to achieve the positional relationship described above. In addition, the auxiliary lens terminal LPA is disposed between the twelfth lens connector terminal LP12 and the third lens connector terminal LP3 in the embodiment. Except for the twelfth lens connector terminal LP12 and the third lens connector terminal LP3, the lens connector terminals include exposed areas all assuming identical shapes and are disposed over equal intervals. The twelfth lens connector terminal LP12 and the third lens connector terminal LP3, however, include exposed areas that are smaller (narrower) than the exposed areas of the other lens connector terminals. The contact area of the auxiliary lens terminal LPA has a shape identical to the shape of the contact areas of the twelfth lens connector terminal LP12 and the third lens connector terminal LP3, and the intervals between the twelfth lens connector terminal LP12 and the auxiliary lens terminal LPA and between the auxiliary lens terminal LPA and the third lens connector terminal LP3 are narrower (shorter) than the intervals setting the other connector terminals apart from one another as described above. In other words, the auxiliary lens terminal LPA is an additional terminal inserted between the twelfth lens connector terminal LP12 and the third lens connector terminal LP3 by reducing the space that would accommodate larger exposed areas that would otherwise be included in the twelfth lens connector terminal LP12 and the third lens connector terminal LP3. While the exposed areas of the twelfth lens connector terminal LP12 and the third lens connector terminal LP3 are smaller than the exposed areas of the other lens connector terminals, they are still large enough to achieve a reliable connection with the corresponding body connector terminals. It is to be noted that the auxiliary lens terminal LPA (its exposed area) may adopt a shape different from that of the lens connector terminals or it may be formed to achieve a shape identical to that of the lens connector terminals. It is to be further noted that the phrase "the auxiliary lens terminal LPA is disposed between the twelfth lens connector terminal LP12 and the third lens connector terminal LP3" means that the auxiliary lens terminal LPA is disposed on the same circular arc pattern centered on the mount center point, which is formed by the twelve lens connector terminals LP1 through LP12.

It is to be noted that the second lens connector terminal LP2 and the twelfth lens connector terminal LP12, used as ground terminals in conjunction with the first lens connector terminal LP1 and the eleventh lens connector terminal LP11 in the power supply systems through which source voltages (the operating voltage and the drive voltage described earlier) are provided, are set between the first lens connector terminal LP1 and the third lens connector terminal LP3 through the tenth lens connector terminal LP10 respectively, i.e., terminals in the communication systems (communication system terminals) and between the eleventh lens connector terminal LP11 and the communication system terminals, so as to minimize the extent to which the communication system terminals (signal lines) are affected by the power supply system terminals (signal lines).

The signal lines through which the source voltages are supplied (the signal lines running through the first lens connector terminal LP1 and the eleventh lens connector terminal LP11) are each bound to manifest a significant voltage change as the load on the source voltage recipient fluctuates. Such a significant voltage change may adversely affect the communication system signal lines. This adverse effect is minimized in the embodiment by disposing the ground terminals (the second lens connector terminal LP2 and the twelfth lens connector terminal LP12), at which voltages tend to remain stable compared to the power supply terminals (the first lens connector terminal LP1 and the eleventh lens connector terminal LP11), between the communication system terminals (the third lens connector terminal LP3 through the tenth lens connector terminal LP10) and the power supply terminals (the first lens connector terminal LP1 and the eleventh lens connector terminal LP11).

While the group of lens connector terminals connected to the first lens-side communication unit 217, i.e., the third lens connector terminal LP3, the fourth lens connector terminal LP4, the fifth lens connector terminal LP5 and the eighth lens connector terminal LP8, is disposed next to the group of lens connector terminals connected to the second lens-side communication unit 218, i.e., the ninth lens connector terminal LP9, the tenth lens connector terminal LP10, the sixth lens connector terminal LP6 and the seventh lens connector terminal LP7, none of the third lens connector terminal LP3, the fourth lens connector terminal LP4 and the fifth lens connector terminal LP5, connected to the first lens-side communication unit 217, and the sixth lens connector terminal LP6 and the seventh lens connector terminal LP7, connected to the second lens-side communication unit 218, occupies a position next to a terminal connected to a different (other) communication unit (217 or 218). In other words, the eighth lens connector terminal LP8, the ninth lens connector terminal LP9 and the tenth lens connector terminal LP10 are disposed in close proximity to each other, each occupying a position close to a terminal connected to the different (other) communication unit. This positional arrangement is adopted since signals that are not synchronous with a clock signal are transmitted through the eighth lens connector terminal LP8, the ninth lens connector terminal LP9 and the tenth lens connector terminal LP10, as will be described in detail later. A signal that is not synchronous with a clock signal manifests less change compared to the clock signal or a signal synchronous with the clock signal. For instance, a signal that is synchronized with a clock signal may manifest a status change of approximately 1 kHz to several kHz per unit time. Under normal circumstances, a clock signal and a signal synchronous with the clock signal manifest significant changes per unit time of up to several MHz (e.g., a clock signal may manifest an 8 MHz change and a data signal synchronous with the clock signal may manifest a 4 MHz change (depending upon the data volume)) and thus, such changes tend to result in noise. Accordingly, it is desirable to dispose each of the terminals, through which a clock signal or a signal synchronous with the clock signal is transmitted, away from any terminal connected to the different (other) communication unit, so as to minimize the adverse effect on communication. In the embodiment, such a positional arrangement is achieved by disposing the group of terminals (the eighth lens connector terminal LP8, the ninth lens connector terminal LP9 and the tenth lens connector terminal LP10), through which signals asynchronous with a clock signal are transmitted, between the group of terminals (the third lens connector terminal LP3, the fourth lens connector terminal LP4 and the fifth lens connector terminal LP5) through which a clock signal and signals synchronous with the clock signal are transmitted in the first lens-side communication unit 217 and the group of terminals (the sixth lens connector terminal LP6 and the seventh lens connector terminal LP7) through which a clock signal and a signal synchronous with the clock signal are transmitted in the second lens-side communication unit 218.

The ninth lens connector terminal LP9, the tenth lens connector terminal LP10, the sixth lens connector terminal LP6 and the seventh lens connector terminal LP7, less affected by noise, are disposed further toward the second power supply circuit 140, whereas the third lens connector terminal LP3, the fourth lens connector terminal LP4, the fifth lens connector terminal LP5 and the eighth lens connector terminal LP8 are disposed further toward the first power supply circuit 130. The level of power consumption in the lens drive unit 212, to which power is supplied via the second power supply circuit 140, changes greatly depending upon whether or not the lens drive unit 212 is engaged in drive of the focusing lens 210b. This means that the level of electric current flowing through the second lens connector terminal LP2 tends to fluctuate greatly and such a change in the electric current is bound to affect any communication system terminals in the vicinity to an extent greater than a change in the electric current flowing through the twelfth lens connector terminal LP12 would. However, communication is carried out via the lens connector terminals LP9, LP10, LP6 and LP7 over cycles shorter than those of the communication carried out via the lens connector terminals LP3, LP4, LP5 and LP8, as will be explained in further detail later. Thus, even if a communication failure occurs due to a change in the electric current flowing through the second lens connector terminal LP2, the communication can be re-executed promptly. The communication is carried out via the lens connector terminals LP9, LP10, LP6 and LP7 over cycles approximately equal to or less than one tenth of the cycles of the communication carried out via the lens connector terminals LP3, LP4, LP5 and LP8. As will be described in detail later, the communication through the lens connector terminals LP9, LP10, LP6 and LP7 is carried out over 1 ms cycles and the communication through the lens connector terminals LP3, LP4, LP5 and LP8 is carried out over 16 ms cycles in the embodiment. This means that the lens connector terminals LP9, LP10, LP6 and LP7 can be disposed next to the second lens connector terminal LP2 without subjecting them to any significant adverse effect of noise, to which the lens connector terminals LP3, LP4, LP5 and LP8 would be subjected if they were disposed next to the second lens connector terminal LP2.

In addition, the second lens connector terminal LP2 is disposed next to the seventh lens connector terminal LP7, which assures a higher level of noise tolerance compared to the sixth lens connector terminal LP6. As will be described in detail later, a clock signal and a data signal synchronous with the clock signal are respectively transmitted through the sixth lens connector terminal LP6 and the seventh lens connector terminal LP7. If the leading edge or the trailing edge of the clock signal becomes indefinite due to noise, accurate synchronization will not be achieved on the reception side. The signal level of the data signal is sampled with the timing of the leading edge or the trailing edge of the clock signal. In other words, the data signal only needs to assure a clear signal level with the timing of the leading edge or the trailing edge of the clock signal, and thus, the noise tolerance of the data signal is considered higher than that of the clock signal.

It is to be noted that the positional arrangement with which the twelve body connector terminals BP1 through BP12 are disposed in the holding portion 102 at the camera body 100, as shown in FIGS. 4A and 4B, is similar to the positional arrangement adopted for the twelve lens connector terminals LP1 through LP12 at the exchangeable lens 200, and for this reason, a repeated explanation is not provided.

As explained earlier, the camera body mount unit 101 adopts a mount structure widely known as a bayonet mount system, whereby it is positioned so as to face opposite the camera lens mount unit 201 and is then rotated relative to the camera lens mount unit 201 until it becomes engaged with the camera lens mount unit 201. For this reason, the body connector terminals BP1 through BP12 are disposed side-by-side along a direction opposite from the direction in which the lens connector terminals LP1 through LP12 (their exposed areas) are disposed side-by-side, as shown in FIGS. 4A and 5A. Namely, the eleventh lens connector terminal LP11 is disposed at the left end and the first lens connector terminal LP1 is disposed at the right end in FIG. 5A, whereas the eleventh body connector terminal BP11 is disposed at the right end and the first body connector terminal BP1 is disposed at the left end in FIG. 4.

When mounting the exchangeable lens 200 at the camera body 100, the camera lens mount unit 201 in FIG. 5A is rotated clockwise. At this time, the twelve body connector terminals BP1 through BP12 disposed in the holding portion 102, pressed against the surface of the holding portion 202, move along the locus indicated by the one-point chain line in FIG. 5A. In other words, during the mounting process in which the camera body 100 is attached to the camera lens mount unit 201, friction is bound to occur between the twelve body connector terminals BP1 through BP12 and the contact areas of the twelve lens connector terminals LP1 through LP12 and the contact area of the auxiliary lens terminal LPA. The contact areas of the twelve lens connector terminals LP1 through LP12 and the auxiliary lens terminal LPA are formed so that the body connector terminals BP1 through BP12 move over them more smoothly than over the surface of the holding portion 202.

(Description of Command Data Communication)

The lens control unit 203 concurrently receives control data from the first body-side communication unit 117 and transmits response data to the first body-side communication unit 117 over predetermined first cycles (16 ms cycles in the embodiment) via the third lens connector terminal LP3, the fourth lens connector terminal LP4, the fifth lens connector terminal LP5 and the eighth lens connector terminal LP8, i.e., via the signal lines CLK, BDAT, LDAT and RDY, by controlling the first lens-side communication unit 217. The following is a detailed description of the communication carried out by the first lens-side communication unit 217 and the first body-side communication unit 117.

It is to be noted that in the description of the embodiment, the communication carried out by the first lens-side communication unit 217 and the first body-side communication unit 117, respectively under control executed by the lens control unit 203 and the body control unit 103, will be referred to as "command data communication".

Figure 6:
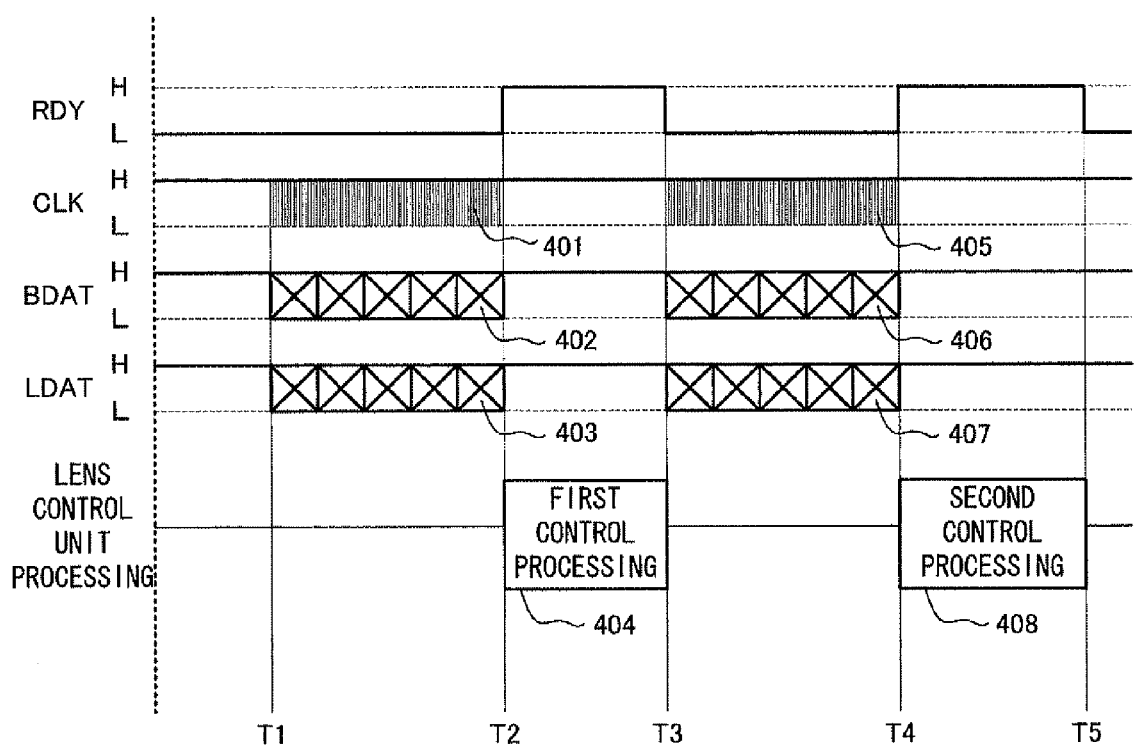
FIG. 6 is a timing chart indicating the timing with which command data communication may be executed.

FIG. 6 is a timing chart indicating the timing with which command data communication may be executed. The body control unit 103 and the first body-side communication unit 117 verify the signal level at the signal line RDY at a command data communication start (T1). The signal level at the signal line RDY indicates whether or not the first lens-side communication unit 217 is in a communication enabled state. If the first lens-side communication unit 217 is in a communication disabled state, the lens control unit 203 and the first lens-side communication unit 217 output an H (high) level signal through the eighth lens connector terminal LP8. In other words, the signal level at the signal line RDY is set to H.

Until the signal line RDY holding H level shifts to L level, the body control unit 103 and the first body-side communication unit 117 do not start communication. They do not execute the next phase of processing for any communication in progress, either.

Upon verifying that the signal level at the signal line RDY is L (low) level, the body control unit 103 and the first body-side communication unit 117 output a clock signal 401 through the third body connector terminal BP3. Namely, the clock signal 401 is transmitted to the first lens-side communication unit 217 through the signal line CLK. In synchronization with the clock signal 401, the body control unit 103 and the first body-side communication unit 117 output a body-side command packet signal 402, which constitutes the first half of control data, via the fourth body connector terminal BP4. Namely, the body-side command packet signal 402 is transmitted to the first lens-side communication unit 217 via the signal line BDAT.

In addition, in synchronization with the clock signal 401 output to the signal line CLK, the lens control unit 203 and the first lens-side communication unit 217 output a lens-side command packet signal 403, which constitutes the first half of response data, via the fifth lens connector terminal LP5. Namely, the lens-side command packet signal 403 is transmitted to the first body-side communication unit 117 via the signal line LDAT.

Upon completion of the transmission of the lens-side command packet signal 403, the lens control unit 203 and the first lens-side communication unit 217 set the signal level at the signal line RDY to H (T2). The lens control unit 203 then starts first control processing 404 (which will be described later) corresponding to the contents of the body-side command packet signal 402 having been received.

Upon completing the first control processing 404, the lens control unit 203 notifies the first lens-side communication unit 217 of the completion of the first control processing 404. In response to this notification, the first lens-side communication unit 217 outputs an L-level signal via the eighth lens connector terminal LP8. In other words, the signal level at the signal line RDY is set to L (T3). In response to the signal level shift, the body control unit 103 and the first body-side communication unit 117 output a clock signal 405 through the third body connector terminal BP3. Namely, the clock signal 405 is transmitted to the first lens-side communication unit 217 via the signal line CLK.

In synchronization with the clock signal 405, the body control unit 103 and the first body-side communication unit 117 output a body-side data packet signal 406, which constitutes the second half of the control data, via the fourth body connector terminal BP4. Namely, the body-side data packet signal 406 is transmitted to the first lens-side communication unit 217 via the signal line BDAT.

In addition, in synchronization with the clock signal 405 output to the signal line CLK, the lens control unit 203 and the first lens-side communication unit 217 output a lens-side data packet signal 407, which constitutes the second half of the response data, via the fifth lens connector terminal LP5. Namely, the lens-side data packet signal 407 is transmitted to the first body-side communication unit 117 via the signal line LDAT.

Upon completion of the transmission of the lens-side data packet signal 407, the lens control unit 203 and the first lens-side communication unit 217 set the signal level at the signal line RDY to H again (T4). The lens control unit 203 then starts second control processing 408 (which will be described later) corresponding to the contents of the body-side data packet signal 406 having been received.

The first control processing 404 and the second control processing 408 executed by the lens control unit 203 are described next.

The body-side command packet signal 402 having been received may be a request for specific data available on the exchangeable lens-side. In such a case, the lens control unit 203 analyzes the contents of the command packet signal 402 and generates the requested specific data through the first control processing 404. Furthermore, as part of the first control processing 404, the lens control unit 203 executes abridged communication error check processing based upon the number of data bytes so as to determine whether or not there has been any error in the communication of the command packet signal 402 by using checksum data contained in the command packet signal 402. A signal carrying the specific data generated through the first control processing 404 is output as the lens-side data packet signal 407 to the body-side. It is to be noted that the body-side data packet signal 406 output from the body side following the initial output of the command packet signal 402 in this situation is a dummy data signal (still containing checksum data) which does not carry any significance to the lens side. Under these circumstances, the lens control unit 203 executes communication error check processing, similar to that described above, by using the checksum data contained in the body-side data packet signal 406 as the second control processing 408.

In another scenario, the body-side command packet signal 402 may be a drive instruction for driving a lens-side drive target member. For instance, the command packet signal 402 may be a drive instruction for the focusing lens 210b and the body-side data packet signal 406 may indicate a drive quantity, i.e., the extent to which the focusing lens 210b needs to be driven. In this case, the lens control unit 203 analyzes the contents of the command packet signal 402 and generates an OK signal acknowledging that the contents have been understood in the first control processing 404. Furthermore, as part of the first control processing 404, the lens control unit 203 executes communication error check processing as described above by using the checksum data carried in the command packet signal 402. The OK signal generated through the first control processing 404 is then output to the body side as the lens-side data packet signal 407. In addition, the lens control unit 203 analyzes the contents of the body-side data packet signal 406 and executes communication error check processing, such as that described above, by using the checksum data contained in the body-side data packet signal 406 in the second control processing 408.

Upon completing the second control processing 408, the lens control unit 203 notifies the first lens-side communication unit 217 of the completion of the second control processing 408. By issuing this notification, the lens control unit 203 prompts the first lens-side communication unit 217 to output an L-level signal through the contact point LP8. Namely, the signal level at the signal line RDY is set to L (T5).

It is to be noted that if the body-side command packet signal 402 is an instruction for driving a lens-side drive target member (e.g., the focusing lens) as described above, the lens control unit 203 engages the lens drive unit 212 in execution of processing through which the focusing lens 210B is driven by the extent matching the drive quantity, while sustaining the signal level at the signal line RDY at L level via the first lens-side communication unit 217.

The communication carried out from the time point T1 through the time point T5 as described above constitutes a single command data communication session. Through the single session of command data communication executed as described above, one body-side command packet signal 402 and one body-side data packet signal 406 are transmitted by the body control unit 103 and the first body-side communication unit 117. Namely, while the processing requires two separate packet signals to be transmitted, the two separate packet signals, i.e., the body-side command packet signal 402 and the body-side data packet signal 406, together constitute a set of control data.

Likewise, one lens-side command packet signal 403 and one lens-side data packet signal 407 are transmitted by the lens control unit 203 and the first lens-side communication unit 217 through the single session of command data communication. Namely, the two separate packet signals, i.e., the lens-side command packet signal 403 and the lens-side data packet signal 407, together constitute a set of response data.

As described above, the lens control unit 203 and the first lens-side communication unit 217 receive the control data from the first body-side communication unit 117 and concurrently transmit the response data to the first body-side communication unit 117. The eighth lens connector terminal LP8 and the eighth body connector terminal BP8 used for command data communication are contact points via which an asynchronous signal (a signal indicating H (high) level or L (low) level read at the signal line RDY) that is not synchronous with any clock signal is transmitted.

(Description of Hotline Communication)

The lens control unit 203 transmits lens position data to the second body-side communication unit 118 via the ninth lens connector terminal LP9, the tenth lens connector terminal LP10, the sixth lens connector terminal LP6 and the seventh lens connector terminal LP7, i.e., via the signal lines HREQ, HANS, HCLK and HDAT, by controlling the second lens-side communication unit 218. The following is a detailed description of the communication carried out by the second lens-side communication unit 218 and the second body-side communication unit 118.

It is to be noted that in the description of the embodiment, the communication carried out by the second lens-side communication unit 218 and the second body-side communication unit 118, respectively under control executed by the lens control unit 203 and the body control unit 103, will be referred to as "hotline communication".

Figure 7A:
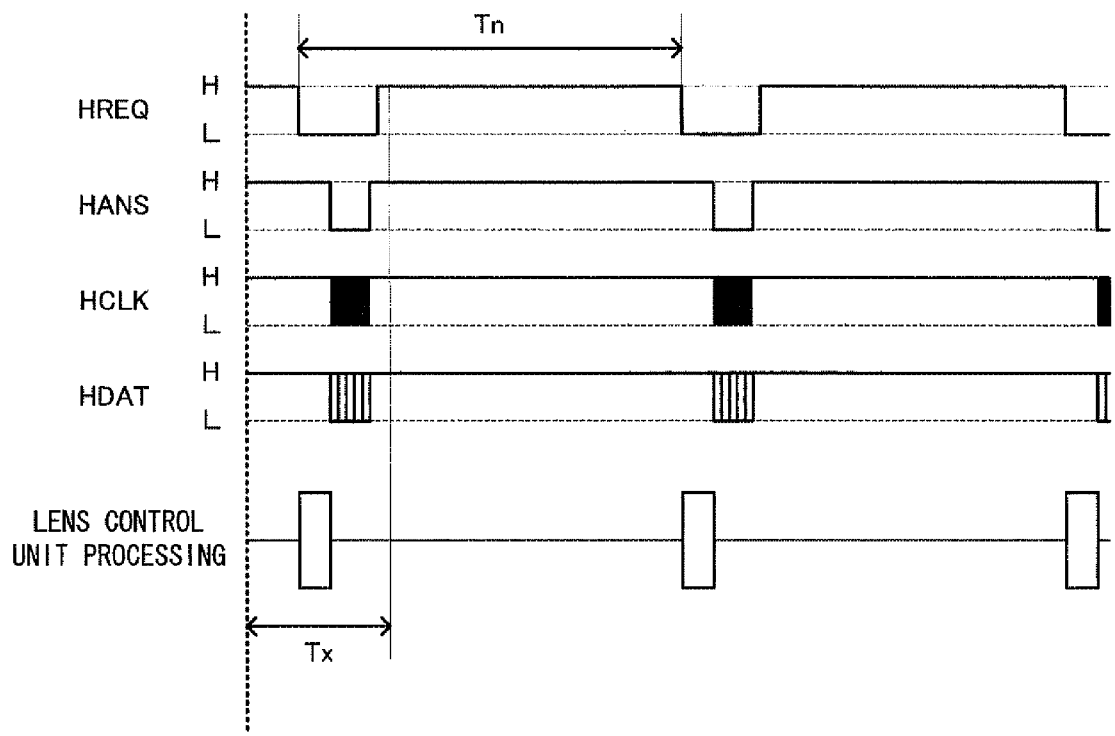
FIGS. 7A and 7B are timing charts indicating the timing with which hotline communication may be executed.
Figure 7B:
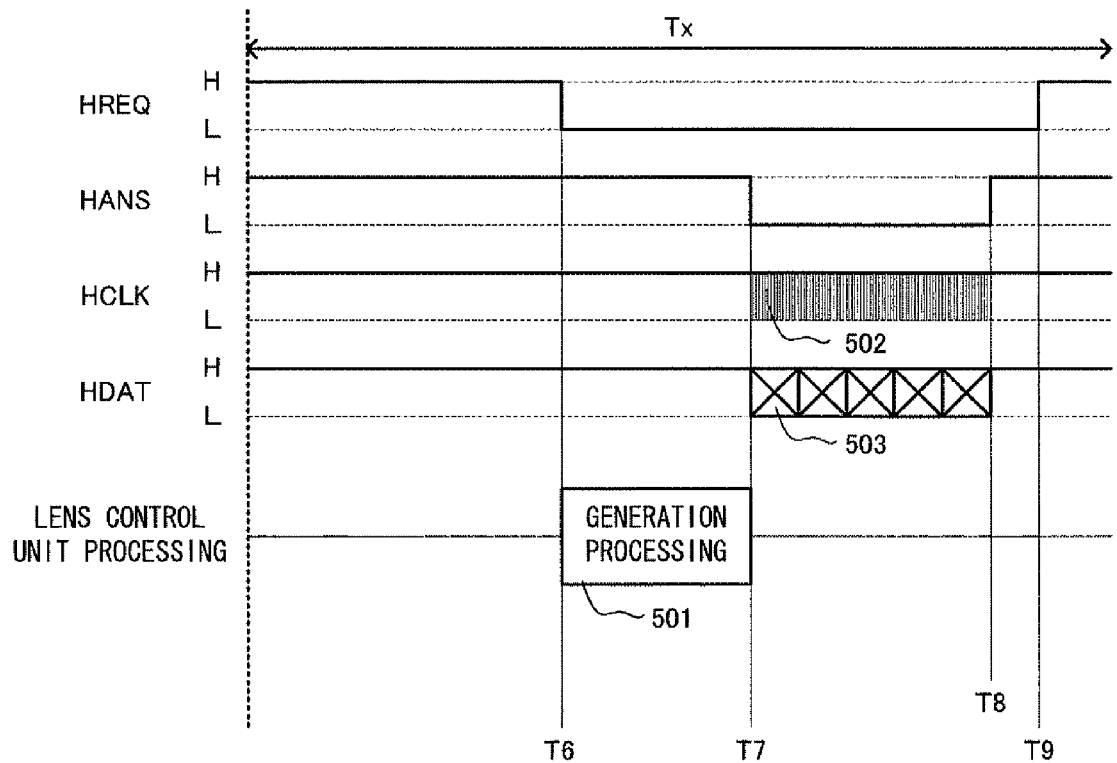

FIGS. 7A and 7B are timing charts indicating the timing with which hotline communication may be executed. The body control unit 103 in the embodiment adopts a structure that allows it to start hotline communication over predetermined second cycles (1 ms cycles in the embodiment). These cycles are shorter than the cycles over which command data communication is executed. FIG. 7A indicates that hotline communication is repeatedly executed over predetermined cycles Tn. FIG. 7B is an enlarged view of a given communication period Tx elapsing as hotline communication is repeatedly executed. The following is a description of the procedure through which hotline communication is carried out, given in reference to the timing chart in FIG. 7B.

The body control unit 103 and the second body-side communication unit 118 first output an L-level signal through the ninth body connector terminal BP9 at a hotline communication start (T6). In other words, the signal level at the signal line HREQ is set to L. The second lens-side communication unit 218 notifies the lens control unit 203 that the signal has been input to the ninth lens connector terminal LP9. In response to this notification, the lens control unit 203 starts executing data generation processing 501 in order to generate lens position data. In the generation processing 501, the lens control unit 203 engages the lens position detection unit 213 in detection of the position of the focusing lens 210B and generates lens position data indicating the detection results.

Once the lens control unit 203 completes execution of the generation processing 501, the lens control unit 203 and the second lens-side communication unit 218 output an L-level signal through the tenth lens connector terminal LP10 (T7). In other words, the signal level at the signal line HANS is set to L. In response to input of this signal at the tenth body connector terminal BP10, the body control unit 103 and the second body-side communication unit 118 output a clock signal 502 via the sixth body connector terminal BP6. Namely, the clock signal is transmitted to the second lens-side communication unit 218 via the signal line HCLK.

In synchronization with the clock signal 502, the lens control unit 203 and the second lens-side communication unit 218 output a lens position data signal 503 carrying the lens position data through the seventh lens connector terminal LP7. In other words, the lens position data signal 503 is transmitted to the second body-side communication unit 118 via the signal line HDAT.

Upon completing the transmission of the lens position data signal 503, the lens control unit 203 and the second lens-side communication unit 218 output an H-level signal through the tenth lens connector terminal LP10. In other words, the signal level at the signal line HANS is set to H (T8). In response to input of this signal at the tenth body connector terminal BP10, the second body-side communication unit 118 outputs an H-level signal through the ninth body connector terminal BP9. In other words, the signal level at the signal line HREQ is set to H (T9).

The communication carried out from the time point T6 through the time point T9 as described above constitutes a single hotline communication session. Through the single session of hotline communication executed as described above, a single lens position data signal 503 is transmitted by the lens control unit 203 and the second lens-side communication unit 218. The ninth lens connector terminal LP9, the tenth lens connector terminal LP10, the ninth body connector terminal BP9 and the tenth body connector terminal BP10 used in hotline communication are contact points via which asynchronous signals that are not synchronous with any clock signal are transmitted. In other words, the ninth lens connector terminal LP9 and the ninth body connector terminal BP9 are contact points via which an asynchronous signal (indicating H (high) level or L (low) level read at the signal line HREQ) is transmitted, whereas the tenth lens connector terminal LP10 and the tenth body connector terminal BP10 are terminals via which an asynchronous signal (indicating H (high) level or L (low) level read at the signal line HANS) is transmitted.

It is to be noted that command data communication and hotline communication may be executed simultaneously or they may be executed partially concurrently. This means that even while one of the communication units, i.e., either the first lens-side communication unit 217 or the second lens-side communication unit 218, is engaged in communication with the camera body 100, the other communication unit is also allowed to communicate with the camera body 100.

(Description of Lens Management Device)

Figure 8:
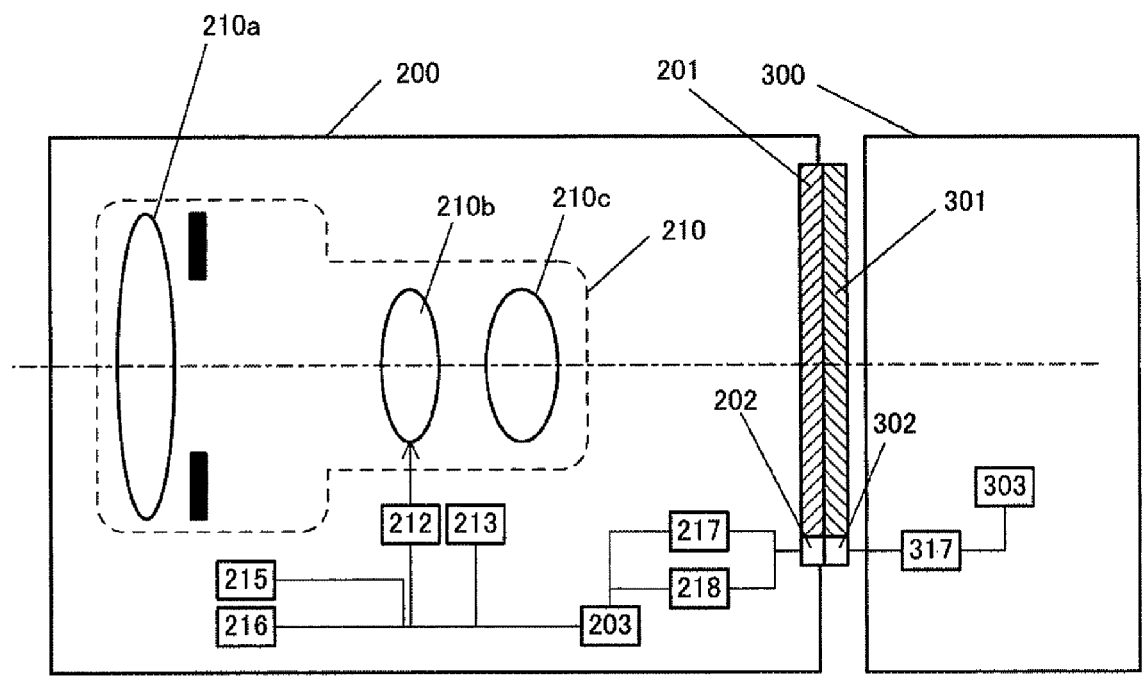
FIG. 8 is a sectional view of a lens management device at which the exchangeable lens can be detachably mounted.

FIG. 8 is a sectional view of a lens management device at which the exchangeable lens 200 can be detachably mounted. The exchangeable lens 200 in the embodiment can be detachably mounted at a lens management device 300 instead of at the camera body 100. The lens management device 300 is a device used for purposes of maintenance of the exchangeable lens 200.

The lens management device 300 includes a management-side mount unit 301 adopting a structure similar to that of the camera body mount unit 101 at the camera body 100. In addition, a holding portion (an electrical connector portion) 302, similar to the holding portion at the camera body mount unit 101, which projects out on the inner circumferential side of the management-side mount unit 301 over part of the inner circumference and holds seven management-side connector terminals, is disposed in an area near the management-side mount unit 301 (on the inner circumferential side of the management-side mount unit 301).

As the exchangeable lens 200 is mounted at the lens management device 300, the plurality of management-side connector terminals held at the holding portion 302 become electrically and physically connected with the plurality of lens connector terminals held at the holding portion 202. Through the terminals in the holding portions, power is supplied from the lens management device 300 to the exchangeable lens 200 and signals are exchanged between the lens management device 300 and the exchangeable lens 200.

A management control unit 303 that controls various units constituting the lens management device 300 is located within the lens management device 300. The management control unit 303 is constituted with a microcomputer, a RAM, peripheral circuits and the like (none shown).

A first management-side communication unit 317 is connected to the management control unit 303. The first management-side communication unit 317, which is connected to the holding portion 302, is able to exchange data with the first lens-side communication unit 217. In other words, the first management side communication unit 317 functions as a communication interface for the lens management device 300. Through this communication interface, the management control unit 303 is able to conduct command data communication with the exchangeable lens 200 (the lens control unit 203) through the procedure described earlier.

Figure 9A:
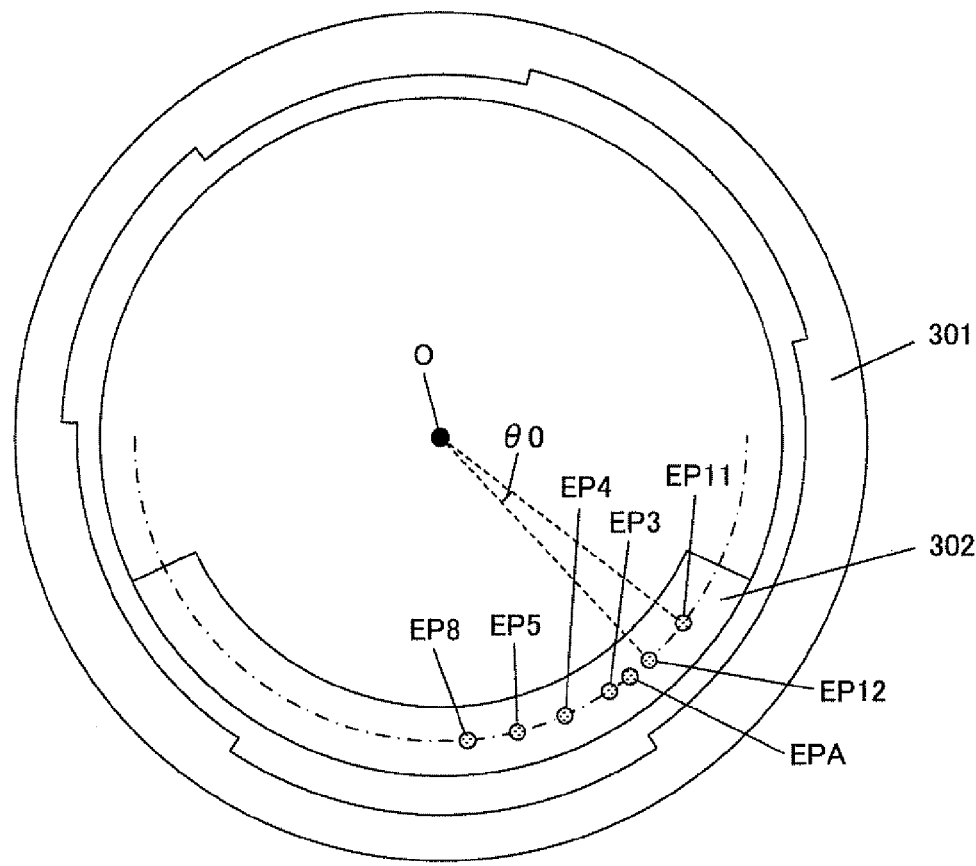
FIGS. 9A and 9B are schematic diagrams showing in detail holding portion.
Figure 9B:
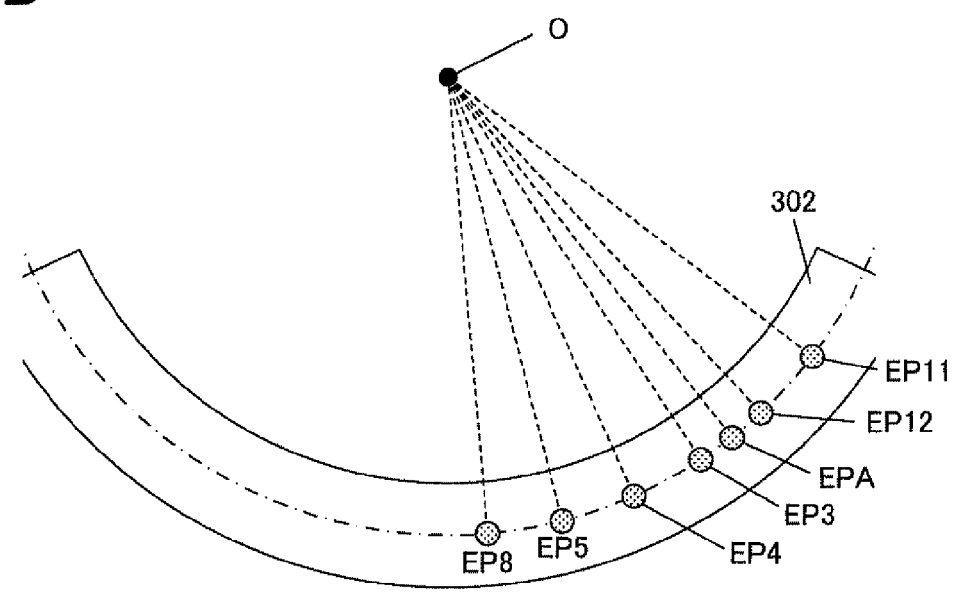

FIGS. 9A and 9B each show the holding portion 302 in detail in a schematic illustration. As shown in FIG. 9A, an eighth management-side connector terminal EP8, fifth management-side connector terminal EP5, a fourth management-side connector terminal EP4, a management-side auxiliary terminal EPA, a third management-side connector terminal EP3, a twelfth management-side connector terminal EP12 and an eleventh management-side connector terminal EP11 are held at the holding portion 302.

The eleventh management-side connector terminal EP11 and the twelfth management-side connector terminal EP12 respectively fulfill functions similar to those of the first body connector terminal BP11 and the twelfth body connector terminal BP12. Namely, through the eleventh management-side connector terminal EP11 and the eleventh lens connector terminal LP11, an operating voltage on which the various units (including the first lens-side communication unit 217 and the second lens-side communication unit 218) located in the exchangeable lens 200 except for the lens drive unit 212 are to operate is provided. In addition, the twelfth management-side connector terminal EP12 is a ground terminal that corresponds to the operating voltage provided through the eleventh management-side connector terminal EP11.

In addition, the eighth management-side connector terminal EP8, the fifth management-side connector terminal EP5, the fourth management-side connector terminal EP4 and the third management-side connector terminal EP3, respectively fulfilling functions similar to those of the eighth body connector terminal BP8, the fifth body connector terminal BP5, the fourth body connector terminal BP4 and the third body connector terminal BP3, are terminals through which command data communication is conducted. The first management side communication unit 317 engages in command data communication with the exchangeable lens 200 via these connector terminals.

It is to be noted that the lens management device 300 in the embodiment does not conduct the hotline communication described earlier with the exchangeable lens 200. For this reason, connector terminals that would be required for hotline communication are not included in the holding portion 302.

The management-side auxiliary terminal EPA is a communication terminal disposed between the third management-side connector terminal EP3 and the twelfth management-side connector terminal EP12 and is connected to the auxiliary lens terminal LPA at the exchangeable lens 200. The management-side auxiliary terminal EPA is grounded within the lens management device 300. Thus, when the lens management device 300 is engaged with the exchangeable lens 200, the auxiliary lens terminal LPA achieves the ground potential, allowing an L (low) level signal to be input to the first lens-side communication unit 217.

Based upon the signal level of the signal input to the first lens-side communication unit 217 via the auxiliary lens terminal LPA, the lens control unit 203 determines whether the camera lens mount unit 201 is attached to the camera body 100 or the lens management device 300. Upon determining that the lens management device 300 is mounted at the camera lens mount unit 201, the lens control unit 203 accepts a specific management command through command data communication. If the "specific management command" has been transmitted from the camera body 100, the lens control unit 203 does not accept the command. Under such circumstances, the lens control unit 203 transmits information indicating an error to the body control unit 103 or simply disregards the command.

The "specific management command" may be, for instance, a firmware update command for updating the contents of the ROM 215 or an operation-verify command for verifying that the various units constituting the exchangeable lens 200 are in a normal operating state. The manufacturer of the exchangeable lens 200 uses this lens management device 300 to conduct maintenance work on the exchangeable lens 200 during, for instance, final inspection prior to product shipment or product repair.

The following advantages are achieved with the camera system in the first embodiment described above.

(1) The auxiliary lens terminal LPA, which remains unconnected with any of the twelve body connector terminals BP1 through BP12, is disposed in the holding portion 202 so that the auxiliary lens terminal LPA will come into contact with at least one body connector terminal among the twelfth body connector terminals BP1 through BP12 during the mounting process through which the camera body 100 is mounted at the camera lens mount unit 201. As a result, the exchangeable lens can be mounted more smoothly and furthermore, a specific positional pattern is formed at the mount surface so as to allow the individual terminals to be identified with better ease.

(2) When the camera body 100 is not attached to the camera lens mount unit 201, the auxiliary lens terminal LPA is allowed to connect with the management-side auxiliary terminal EPA of the lens management device 300. As a result, better expandability is assured when a device other than the camera body 100 is attached to the exchangeable lens 200.

Second Embodiment

Figure 10:
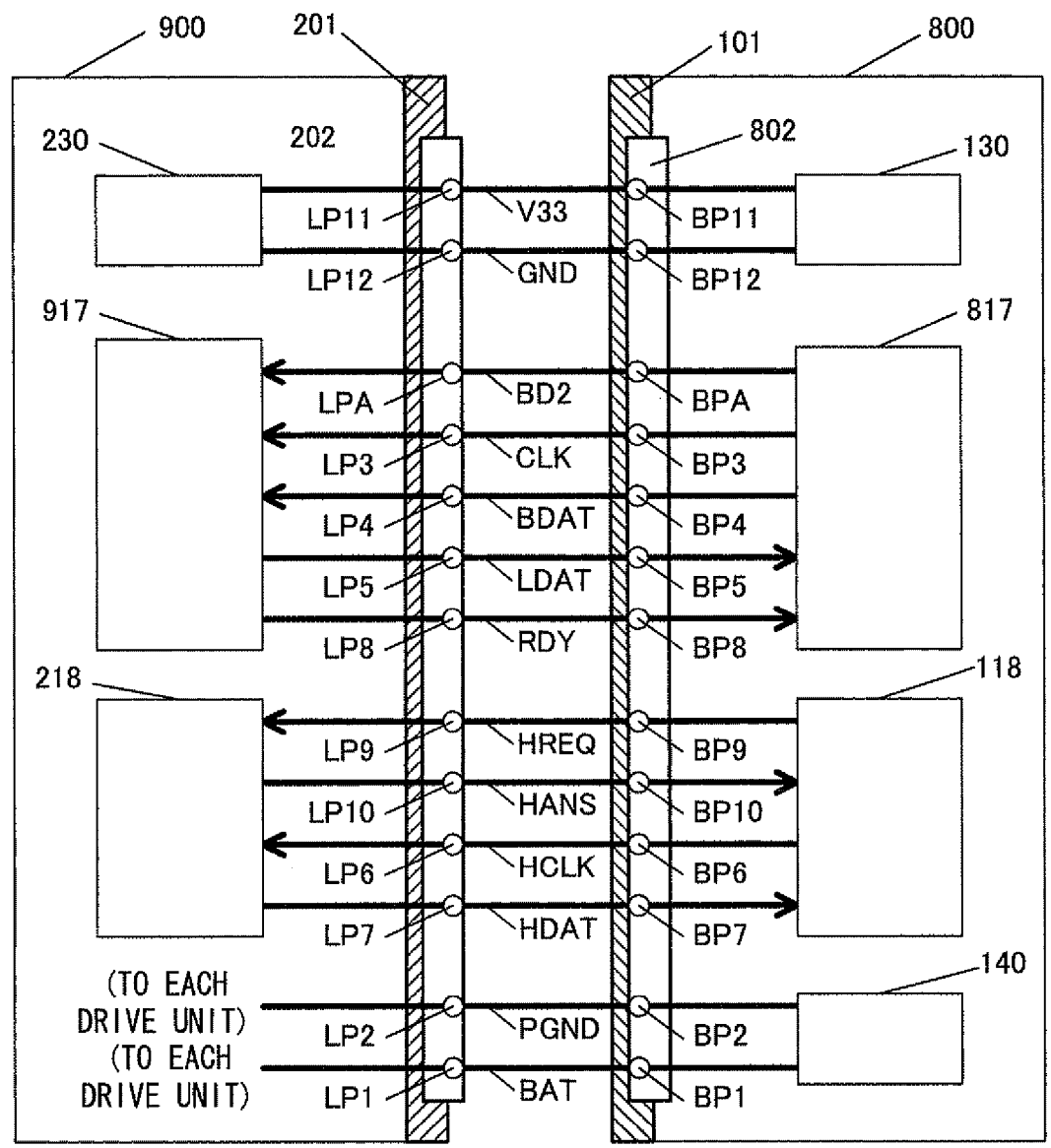
FIG. 10 is a schematic diagram showing in detail each of the holding portions included in the camera system achieved in a second embodiment of the present invention.

FIG. 10 is a schematic diagram showing in detail the individual holding portions included in the camera system achieved in the second embodiment of the present invention. The camera system in the second embodiment of the present invention comprises a camera body 800 adopting a structure similar to that of the camera body 100 in the first embodiment and an exchangeable lens 900 adopting a structure similar to that of the exchangeable lens 200 in the first embodiment. The following is a description of the camera system achieved in the second embodiment, given in reference to FIG. 10. It is to be noted that in the following description, the same reference numerals are assigned to structural elements identical to those in the first embodiment so as to preclude the necessity for a repeated explanation thereof.

A holding portion 802 at the camera body 800 has a structure similar to that of the holding portion 102 in the camera body 100 achieved in the first embodiment, except that a second body terminal BPA is disposed therein at a position matching that of the management-side auxiliary terminal EPA shown in FIGS. 9A and 9B. The second body terminal BPA is connected to a first body-side communication unit 817. The second body terminal BPA is connected to an auxiliary lens terminal LPA at the exchangeable lens 900 so as to configure a signal line BD2 extending between the camera body 800 and the exchangeable lens 900. Data are transmitted from the camera body 800 to the exchangeable lens 900 through the signal line BD2. Through command data communication executed as indicated in FIG. 6, the first body-side communication unit 817 is able to transmit data via the signal line BD2 concurrently as it transmits data via the signal line BDAT. In other words, the first body-side communication unit 817 achieved in this embodiment is capable of executing the command data communication at a data transmission rate twice the data transmission rate of the first body-side communication unit 117 in the first embodiment.

The auxiliary lens terminal LPA disposed in the holding portion 202 of the exchangeable lens 900 is connected to a first lens-side communication unit 917 within the exchangeable lens 900. The first lens-side communication unit 917 is equivalent to the first lens-side communication unit 217 in the first embodiment except that the first lens-side communication unit 917 is capable of transmitting data via the signal line BD2 concurrently as data are transmitted via the signal line BDAT during the command data communication executed as indicated in FIG. 6.

The exchangeable lens 900 in the embodiments may also be mounted at the camera body 100 achieved in the first embodiment. However, since the camera body 100 does not include a terminal to be connected with the auxiliary lens terminal LPA, the data communication executed via the signal line BD2 as described above cannot be conducted in conjunction with the camera body 100. Instead, the lens control unit 203 of the exchangeable lens 900 mounted at the camera body 100 conducts the regular command data communication having been described in reference to the first embodiment. If, on the other hand, the exchangeable lens 900 is mounted at the camera body 800, the lens control unit 203 also conducts command data communication via the signal line BD2, as has been explained earlier.

The following advantage is achieved with the camera system in the second embodiment described above.

(1) Either the camera body 100 or the camera body 800 can be mounted at the camera lens mount 201. Once the camera body 800 is mounted at the camera lens mount 201, the auxiliary lens terminal LPA becomes connected to the second body terminal BPA. As a result, improved functionality over the prior art can be provided at the new camera body 800, assuring better expandability.

Third Embodiment

Figure 11:
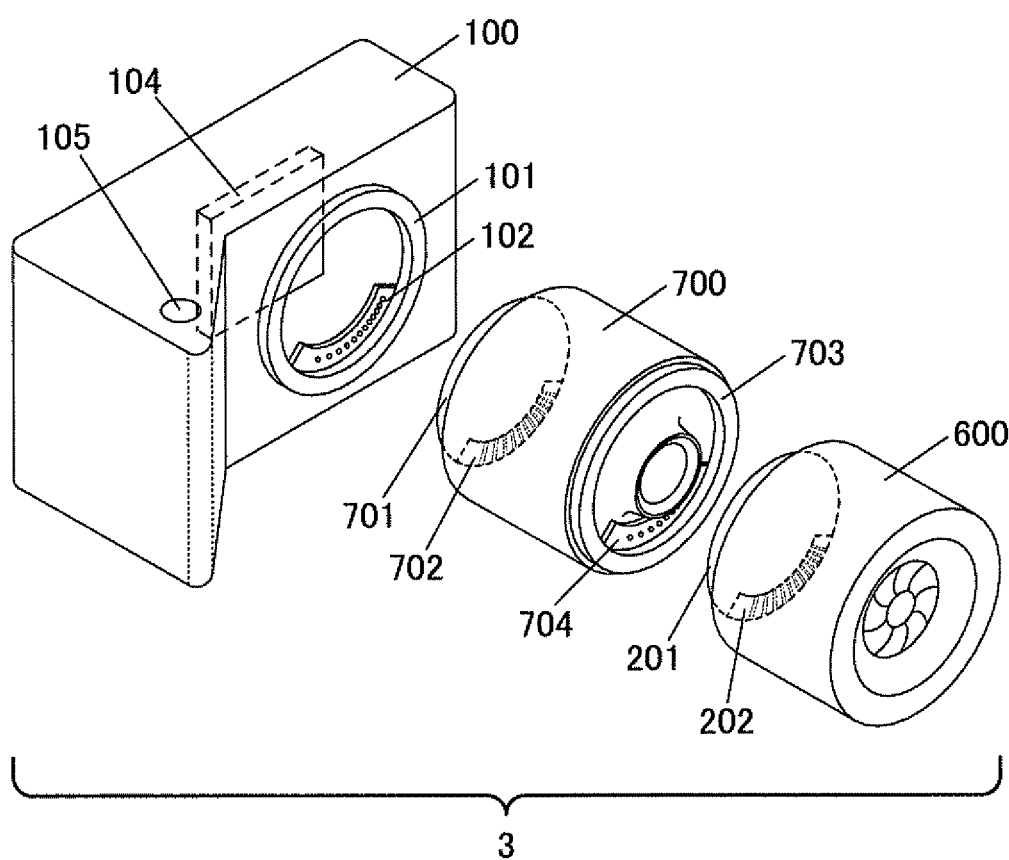
FIG. 11 shows the camera system achieved in a third embodiment in a perspective.

FIG. 11 is a perspective of the camera system achieved in the third embodiment. A camera system 3 achieved in the embodiment comprises a camera body 100, an intermediate adapter 700 that can be detachably mounted at the camera body 100 and an exchangeable lens 600 that can be detachably mounted at the intermediate adapter 700. It is to be noted that in the following description, the same reference numerals are assigned to members and the like identical to those in the first embodiment so as to preclude the necessity for a repeated explanation thereof.

The exchangeable lens 600, adopting a structure similar to that of the exchangeable lens 200 in the first embodiment, can also be directly mounted at the camera body 100, although the intermediate adapter 700 is present between the camera body 100 and the exchangeable lens 600 in the figure. The intermediate adapter 700 is an adapter widely known as a teleconverter. Namely, via this intermediate adapter, the focal length of the image forming optical system 210 in the exchangeable lens 600 can be increased. The casing of the intermediate adapter 700 assumes a cylindrical shape. At one side surface of the intermediate adapter, a first adapter-side mount unit 701, which corresponds to the camera body mount unit 101, is disposed. This first adapter-side mount unit 701 has a structure identical to that of the camera lens mount unit 201 at the exchangeable lens 200. At the other side surface of the intermediate adapter 700, a second adapter-side mount unit 703, which corresponds to the camera lens mount unit 201, is disposed. This second adapter-side mount unit 703 has a structure identical to that of the camera body mount unit 101 at the camera body 100. It is to be noted that the casing of the intermediate adapter 700 may assume a shape other than a cylindrical shape. The first adapter-side mount unit 701 can be detachably mounted at the camera body mount unit 101 of the camera body 100. In addition, the second adapter-side mount unit 703 can be detachably mounted at the camera lens mount unit 201 of the exchangeable lens 600.

A holding portion 702 holding a plurality of terminals, which is similar to that at the exchangeable lens 200 achieved in the first embodiment projects out on the inner circumferential side of the first adapter-side mount unit 701 over part of the inner circumference, is disposed in an area near the first adapter-side mount unit 701 (on the inner circumferential side of the first adapter-side mount unit 701) at the intermediate adapter 700. The holding portion 702 assumes a structure similar to that of the holding portion 202 in the first embodiment except that a terminal equivalent to the auxiliary lens terminal LPA is not present in the holding portion 702.

In addition, a holding portion 704 holding terminals and projecting out on the inner circumferential side of the second adapter-side mount unit 703 over part of the inner circumference, is disposed in an area near the second adapter-side mount unit 703 (on the inner circumferential side of the second adapter-side mount unit 703) at the intermediate adapter 700. A plurality of terminals is held in the holding portion 704. Once the exchangeable lens 600 is attached to the intermediate adapter 700, the terminals held at the holding portion 202 become electrically and physically connected to the plurality of contact points held at the holding portion 704.

Figure 12:
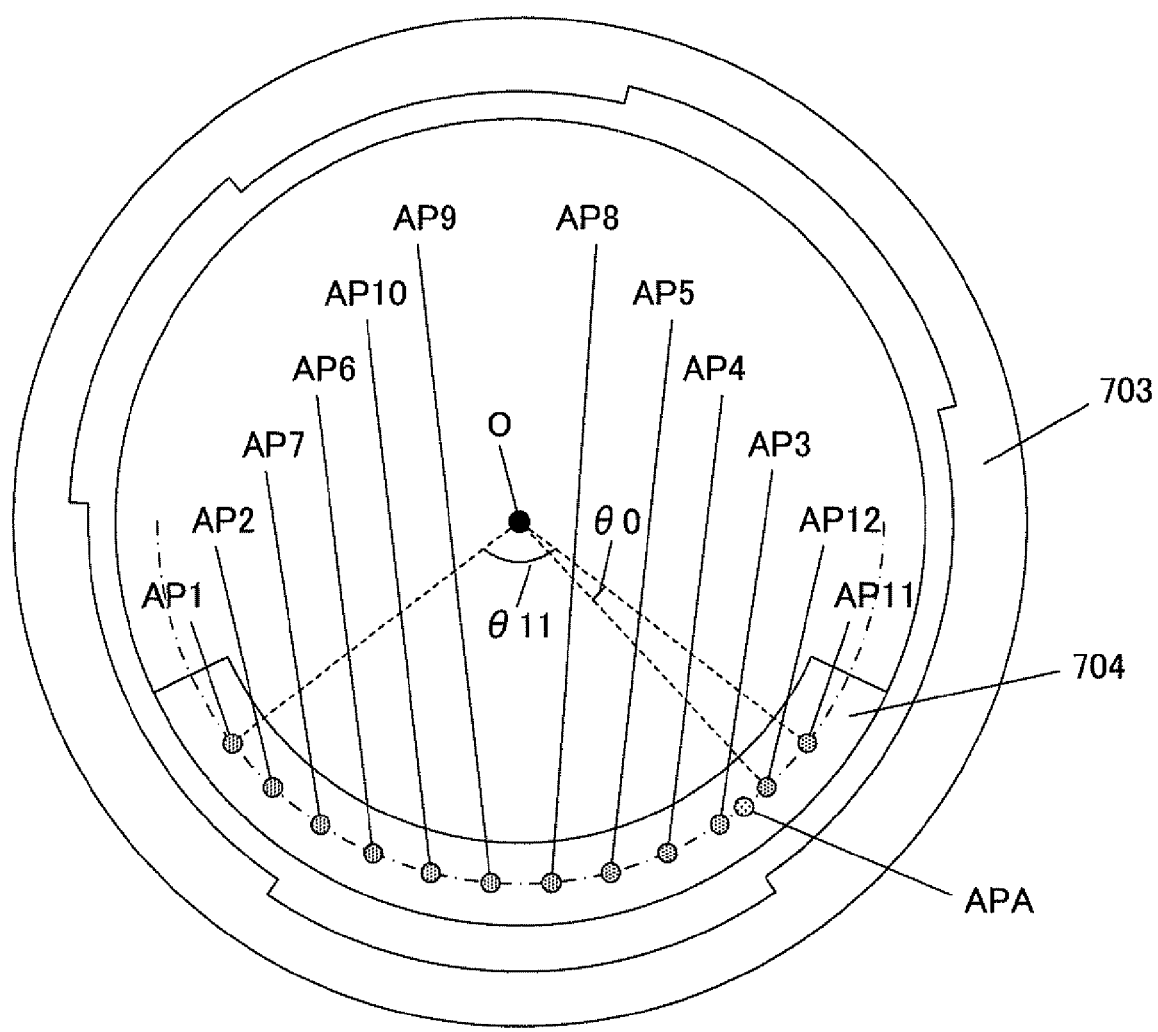
FIG. 12 is a front view of a second adapter-side mount unit.

FIG. 12 is a front view of the second adapter-side mount unit 703. Adapter connector terminals AP1 through AP12, similar to the body connector terminals BP1 through BP12 held in the holding portion 102, are disposed in the holding portion 704. These connector terminals are individually connected to the connector terminals disposed in the holding portion 702 within the intermediate adapter 700. Thus, the camera body 100 (the body control unit 103) is able to conduct command data communication and hotline communication, similar to those described in reference to the first embodiment, with the exchangeable lens 600 via the intermediate adapter 700.

The holding portion 704 further includes an auxiliary adapter terminal APA disposed at a position corresponding to the position of the auxiliary lens terminal LPA. As the exchangeable lens 600 is mounted at the intermediate adapter 700, the auxiliary adapter terminal APA becomes connected with the auxiliary lens terminal LPA at the exchangeable lens 600. The auxiliary adapter terminal APA is grounded inside the intermediate adapter 700.

The auxiliary lens terminal LPA at the exchangeable lens 600 directly mounted at the camera body 100 remains unconnected with any terminal. In this situation, the auxiliary lens terminal LPA is pulled up within the exchangeable lens 600 and thus, an H (high) level signal is input to the first lens-side communication unit 217 at the exchangeable lens 600. When the exchangeable lens 600 is mounted at the camera body 100 via the intermediate adapter 700, on the other hand, the auxiliary lens terminal LPA is connected to the auxiliary adapter terminal APA. In this case, an L (low) level signal is input to the first lens-side communication unit 217 at the exchangeable lens 600. In other words, the signal level of the signal input to the first lens-side communication unit 217 through the auxiliary lens terminal LPA switches depending upon whether or not the intermediate adapter 700 is present between the exchangeable lens 600 and the camera body 100. The lens control unit 203 detects the presence/absence of the intermediate adapter 700 by checking the signal level that switches as described above.

The following advantage is achieved with the camera system in the third embodiment described above.

(1) The lens control unit 203 detects the presence/absence of the intermediate adapter 700 via the auxiliary lens terminal LPA. This means that the presence/absence of the intermediate adapter 700 can be detected with ease.

Fourth Embodiment

The camera system achieved in the fourth embodiment of the present invention, having a configuration similar to that of the camera system in the first embodiment, includes lens connector terminals with their exposed areas assuming a profile different from the profile of the lens connector terminals in the first embodiment. The following is a description of the profile of the lens connector terminals at their exposed areas as achieved in the fourth embodiment. It is to be noted that in the following description, the same reference numerals are assigned to components similar to those of the first embodiment so as to preclude the necessity for a repeated explanation thereof. In addition, it is assumed that the camera body and the lens management device in the camera system are identical to those in the first embodiment.

Figure 13A:
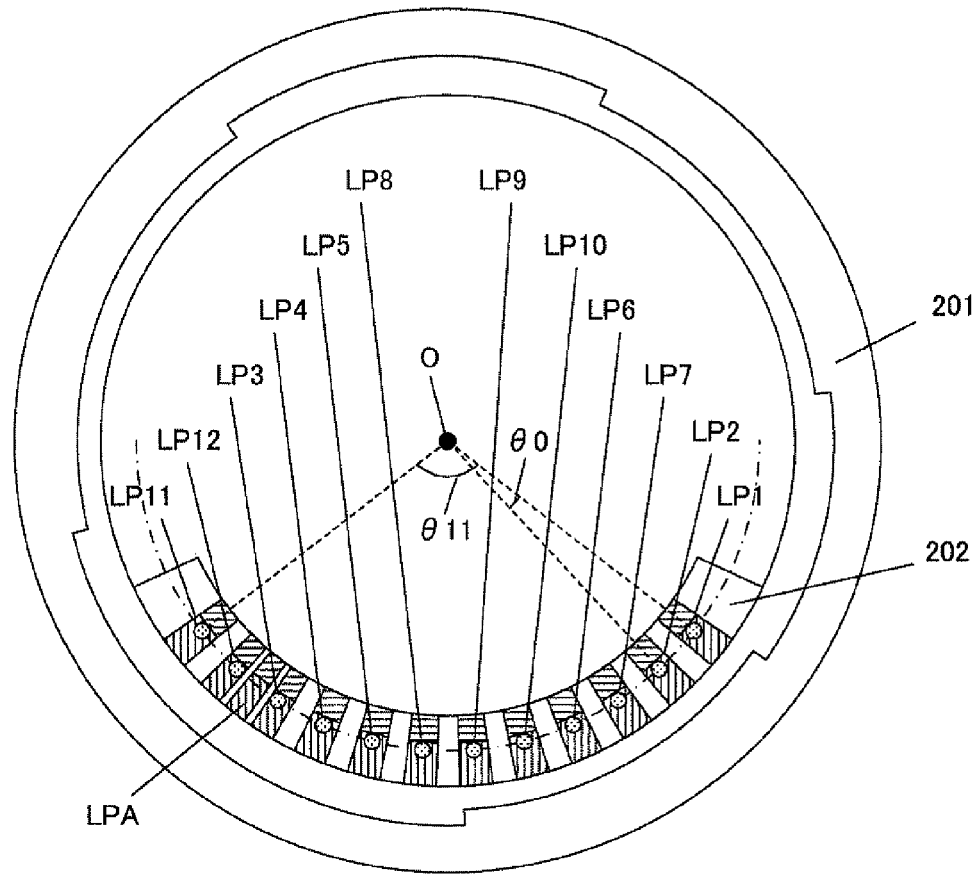
Figure 13B:
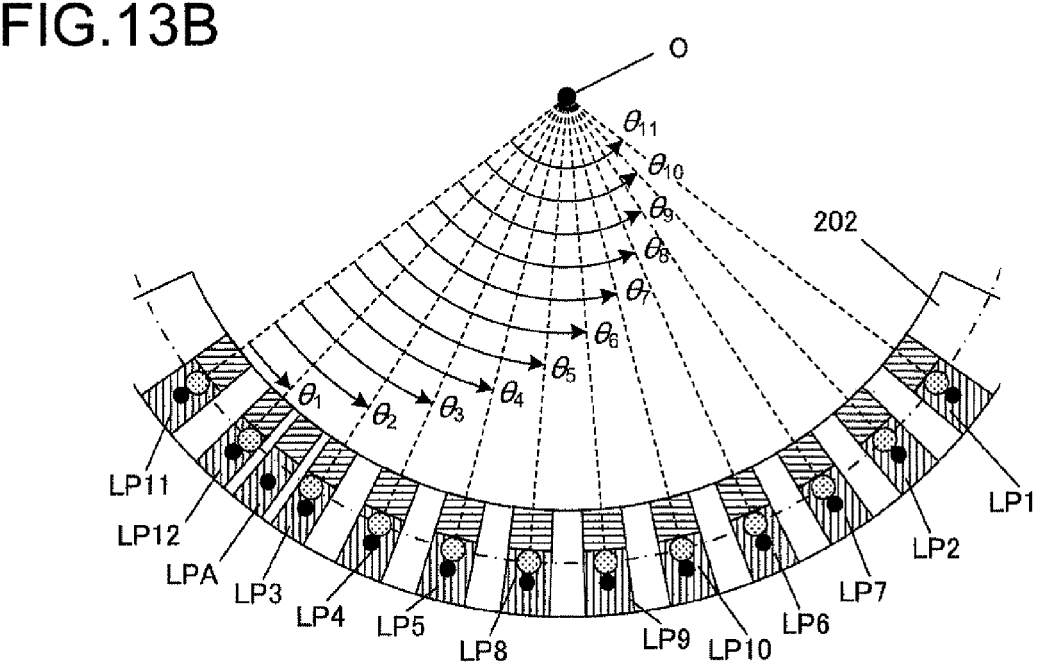

FIGS. 13A and 13B show a holding portion 202 achieved in the fourth embodiment in front views. As FIGS. 13A and 13B indicate, twelve lens connector terminals LP1 through LP12 and an auxiliary lens terminal LPA disposed in the holding portion 202 at the camera lens mount unit 201 in the embodiment each assume a size large enough to range from the inner circumferential side (the side closer to the mount center point O) of the holding portion 202 through the outer circumferential side (the side further away from the mount center point O) of the holding portion 202. However, the size of their exposed areas and the positions of the exposed areas are the same as those of the terminals in the first embodiment described in reference to FIGS. 5A and 5B. The following is a description of features unique to the fourth embodiment, given in reference to a sectional view of the eighth lens connector terminal LP8.

Figure 14A:
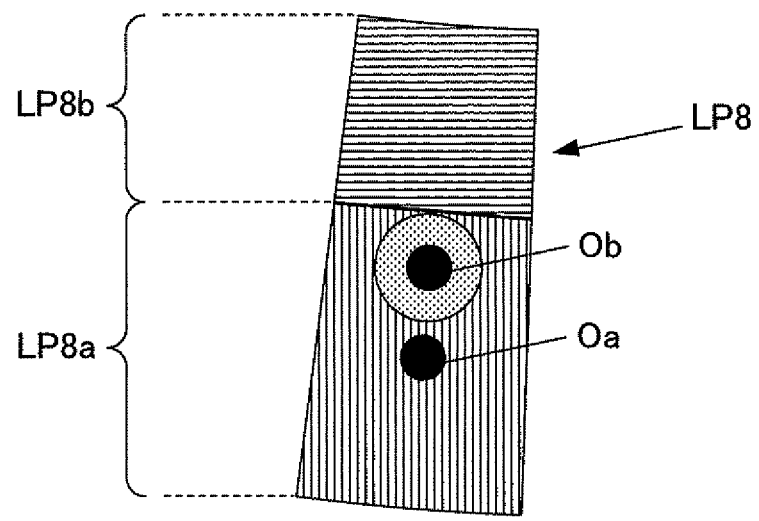
Figure 14B:
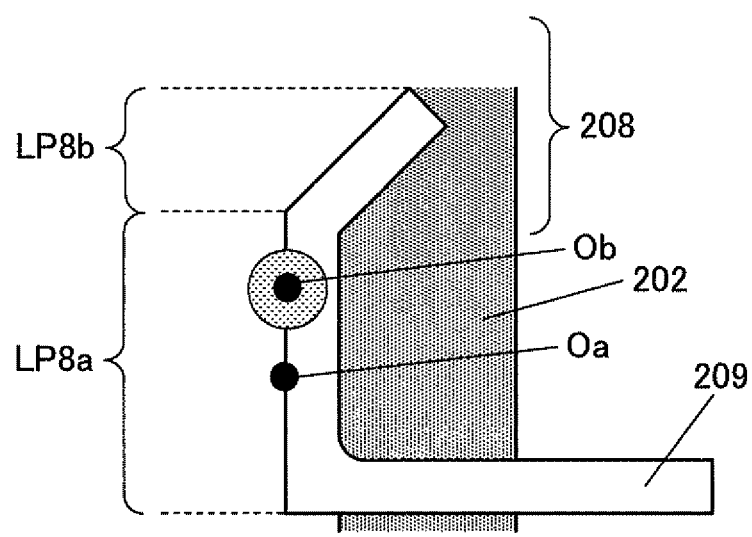

FIG. 14A is an enlarged front view of the eighth lens connector terminal LP8, whereas FIG. 14B shows the eighth lens connector terminal LP8 and the holding portion 202 in a sectional view. As shown in the sectional view presented in FIG. 14B, one end of a metal piece 209 constituting the eighth lens connector terminal LP8 is placed in a recess 208 formed at the surface of the holding portion 202. Namely, the surface of the metal piece 209 includes two different areas, i.e., an exposed area LP8a, which is exposed at the surface of the holding portion 202, and a fixing part LP8b at which the metal piece 209 is fixed to the holding portion 202. While the exposed area, viewed from the surface as in FIG. 14A, appears to be larger than those shown in FIGS. 5A and 5B, the size of the exposed area LP8a is actually the same as that of the exposed areas in FIGS. 5A and 5B. This means that the eighth lens connector terminal LP8 in the embodiment centers on a central point Oa of its exposed area, instead of a central point Ob of the entire range, which includes the fixing part LP8b.

While a repeated explanation is not provided, the exposed areas of the remaining eleven lens connector terminals and the auxiliary lens terminal LPA are identical to the exposed area of the eighth lens connector terminal LP8 described above. Namely, the size of the exposed areas and the positions of the exposed areas of the remaining eleven lens connector terminals and the auxiliary lens terminal LPA are the same as those of the lens connector terminals shown in FIGS. 5A and 58, and the area that would appear to have been added on at the surface is accounted for by the fixing part at which each metal piece is fixed to the holding portion 202. It is to be noted that while the explanation is given above by assuming that the sizes and positions of the exposed areas are the same as those in the first embodiment described in reference to FIGS. 5A and 58, exposed areas may be formed to range over sizes and positions different from those in the first embodiment.

The camera system achieved in the fourth embodiment as described above realizes advantages similar to those of the first embodiment.

The present invention allows for the following variations and one of the variations or a plurality of variations may be adopted in combination with any of the embodiments described above.

(Variation 1)

Figure 15:
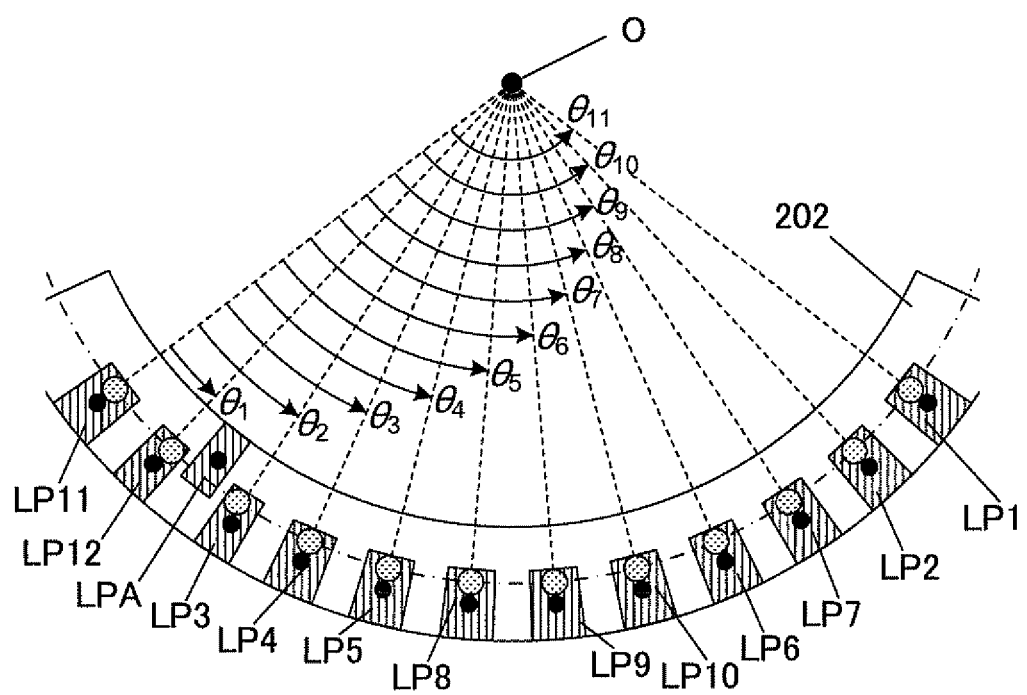
FIG. 15 is a front view of a holding portion, showing a positional arrangement with which the lens connector terminals may be disposed.

For instance, the exposed area of a single terminal (e.g., the auxiliary lens terminal LPA) alone among the twelve lens connector terminals LP1 through LP12 and the auxiliary lens terminal LPA, may be disposed further toward the inner circumferential side of the holding portion 202 (the side closer to the mount center point O) with the exposed areas of the remaining terminals, i.e., the twelve lens connector terminals LP1 through LP12 disposed further toward the outer circumferential side of the holding portion 202 (the side further away from the mount center point O), as shown in FIG. 15. In other words, the lens connector terminals may be arranged such that a distance between the exposed area of at least one lens connector terminal among the twelve lens connector terminals and the auxiliary lens terminal and the mount center point O is different from a distance between the exposed area of at least one of the remaining lens contact terminals and the mount center point O. It is to be noted that, the exposed area of a terminal other than the auxiliary lens terminal LPA may be disposed further toward the inner circumferential side of the holding portion 202, or more than one exposed area may be disposed further toward the inner circumferential side of the holding portion 202. In addition, the sizes of the exposed areas of the twelve lens connector terminals LP1 through LP12 and the auxiliary lens terminal LPA may all be the same or at least one lens connector terminal may include an exposed area, the size of which is different from that of the exposed areas in the remaining terminals. By arranging the lens connector terminals such that a distance between the exposed area of at least one lens connector terminal among the twelve lens connector terminals and the auxiliary lens terminal and the mount center point O is different from a distance between the exposed area of at least one of the remaining lens contact terminals and the mount center point O, the mounting operation of the exchanging lens is facilitated, and also each terminal can be easily identified since a specific pattern is formed on the mount surface.

(Variation 2)

In the embodiments described above, the plurality of lens connector terminals are disposed along the lower edge of the holding portion 202, as illustrated in FIGS. 5A and 5B. However, the present invention is not limited to this example and the plurality of lens connector terminals may be disposed in the holding portion 202 by adopting a different positional arrangement. In addition, the plurality of lens connector terminals may be disposed at any positions within the holding portion 202 and the holding portion 202 may adopt any shape that may be different from the shape shown in FIGS. 5A and 5B.

(Variation 3)

The embodiments have been described by assuming that the position data indicating the position of the focusing lens 210B are transmitted from the exchangeable lens 200 to the camera body 100 through hotline communication. However, the present invention is not limited to this example and may be adopted in a system configured so as to transmit condition information pertaining to a drive target member other than the focusing lens through hotline communication. For instance, the present invention may be adopted in conjunction with an exchangeable lens 200 equipped with a blur correction lens, via which image blur attributable to unsteady handling during photographing operation is corrected. In such a case, position data indicating the position of the blur correction lens (X,Y position) may be transmitted through hotline communication. Furthermore, the present invention may be adopted in a system in which position information indicating the position of the aperture included in the exchangeable lens (information related to the size of the aperture opening) is transmitted. Moreover, in conjunction with an exchangeable lens 200 that includes a zoom lens, information related to the focal length of the lens may be transmitted through hotline communication. Under such circumstances, the generation processing 501 in FIG. 7B will include processing for generating blur correction lens position data, processing for generating aperture control position data pertaining to the aperture used to form the aperture opening (position information corresponding to the opening size), or processing for generating zoom lens position data.

(Variation 4)

The holding portion 102 (on the body side) and the holding portion 202 (on the lens side) are each manufactured as an integrated component (single component) in the embodiments described earlier. However, the present invention is not limited to this example and it may be adopted in conjunction with holding portions 102 and 202 each constituted with a plurality of separate holding portion parts, with one part corresponding to a specific number of terminals, which are put together as a single assembly.

(Variation 5)

While the camera system described in reference to the embodiments includes separate communication interfaces in correspondence to two different types of communication (hotline communication and command data communication), the present invention may be adopted in conjunction with an integrated communication interface. Namely, the first lens-side communication unit 217 and the second lens-side communication unit 218 on the exchangeable lens side may be integrated into a single communication unit. Likewise, the first body-side communication unit 117 and the second body-side communication unit 118 on the camera body side may be integrated into a single communication unit. Furthermore, a body control unit and a lens control unit with built-in functions enabling them to fulfill the functions of the corresponding communication interfaces, instead of the body control unit 103 and the lens control unit 203, may be utilized.

(Variation 6)

The present invention is adopted in a camera system comprising the camera body 100 and the exchangeable lens 200 in the embodiments described earlier. However, the present invention is not limited to this example, and the structure described in reference to the embodiments (the camera body-side structure) may be adopted in any electronic device that includes a mount at which the exchangeable lens 200 can be attached, is capable of communicating with the exchangeable lens 200 and is also capable of providing power to the exchangeable lens. Such an electronic device may be, for instance, a projector. A projector system similar to the camera system described in reference to the embodiments can be achieved by configuring the projection lens of the projector as a detachable/exchangeable projection lens.

(Variation 7)

As has been described, the camera system achieved in the embodiments may include a blur correction mechanism equipped with a blur correction lens movable along a direction with directional components perpendicular to the optical axis of the image forming optical system 210, via which image blur due to unsteady hand movement is corrected by driving the blur correction lens. However, the present invention is not limited to this example and may be adopted in conjunction with a blur correction mechanism that corrects image blur by displacing (swinging) a blur correction optical system within a plane that contains the optical axis of the image forming optical system 210.

(Variation 8)

While the present invention is adopted in conjunction with mounts assuming a bayonet structure in the embodiments described above, the present invention may instead be adopted in conjunction with a mount assuming a structure other than the bayonet structure. For instance, it may be adopted in an exchangeable lens that includes a mount with an alternative structure, e.g., a screw mount.

(Variation 9)

The exchangeable lens in the embodiments described above includes a single auxiliary lens terminal LPA. However, the present invention is not limited to this example and it may be adopted in an exchangeable lens with two or more auxiliary lens terminals. In such a case, different functions may be assigned to the individual auxiliary lens terminals or a single function may be assigned to all the auxiliary lens terminals. In addition, the auxiliary lens terminal LPA may be disposed at a position other than that indicated in FIGS. 5A and 5B. In other words, the auxiliary lens terminal may be disposed at any position, as long as it is ensured that it comes into contact with one of the body connector terminals BP1 through BP12 during the mounting process through which the camera body 100 is mounted at the camera lens mount unit 201.

The exchangeable lens achieved in any of the embodiments of the present invention described above can be mounted at the camera body in a smooth manner.

As long as the features characterizing the present invention are not compromised, the present invention is not limited to the particulars of the embodiments described above and other modes that are conceivable within the technical scope of the present invention are also within the scope of the invention.

What is claimed is:

1. An exchangeable lens, comprising:
a camera lens mount unit at which a camera body, with twelve body connector terminals disposed near a camera body mount unit at the camera body, is mounted, with the camera lens mount unit having a mount center point;
a holding portion where twelve lens connector terminals, each connected to one of the twelve body connector terminals and each having a contact area to come into contact with one of the body connector terminals, and at least one auxiliary lens terminal having a contact area are disposed therein so as to form a circular arc pattern relative to the amount center point;
an optical system that includes a drive target member which can be driven; and
a drive unit that drives the drive target member, wherein:
the twelve lens connector terminals are:
a first lens connector terminal through which a drive voltage to be used to engage the drive unit in operation is provided from the camera body;
a second lens connector terminal that functions as a ground terminal corresponding to the drive voltage;
a third lens connector terminal through which a first clock signal from the camera body is input;
a fourth lens connector terminal through which a first data signal from the camera body is input in synchronization with the first clock signal;
a fifth lens connector terminal through which a second data signal is output to the camera body in synchronization with the first clock signal;
a sixth lens connector terminal through which a second clock signal from the camera body is input;
a seventh lens connector terminal through which a third data signal is output to the camera body in synchronization with the second clock signal;
an eighth lens connector terminal through which a first asynchronous signal that is not synchronous with the first clock signal or the second clock signal is output to the camera body;
a ninth lens connector terminal through which a second asynchronous signal that is not synchronous with the first clock signal or the second clock signal is input from the camera body;
a tenth lens connector terminal through which a third asynchronous signal that is not synchronous with the first clock signal or the second clock signal is output to the camera body;
an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and
a twelfth lens connector terminal that functions as a ground terminal corresponding to the operating voltage;
an interior angle formed by the contact area of the first lens connector terminal and the contact area of the eleventh lens connector terminal at the mount center point is largest among interior angles, each formed by contact areas of any two lens connector terminals among the twelve lens connector terminals and the auxiliary lens terminal at the mount center point;
an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;
an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;
an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;
an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;
an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;
an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;

an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and an interior angle formed by the contact area of the auxiliary lens terminal and the contact area of the eleventh lens connector terminal at the mount center point is smaller than an interior angle formed by the contact area of the first lens connector terminal and the contact area of the eleventh lens connector terminal at the mount center point.

2. An exchangeable lens according to claim 1, wherein:
the auxiliary lens terminal is a terminal that remains unconnected with any of the twelve body connector terminals.

3. An exchangeable lens according to claim 1, wherein:
the auxiliary lens terminal is a terminal used for purposes of maintenance.

4. An exchangeable lens according to claim 1, wherein:
either a first camera body, which includes the twelve body connector terminals, or a second camera body, which further includes, in addition to the twelve body connector terminals, a second body terminal disposed near the camera body mount unit, can be mounted at the camera lens mount unit; and
when the second camera body is mounted at the camera lens mount unit, the auxiliary lens terminal is connected with the second body terminal.

5. An exchangeable lens according to claim 1, wherein:
the camera body can be mounted at the camera lens mount unit via an intermediate adapter that includes an adapter terminal to be connected to the auxiliary lens terminal; and
the exchangeable lens further comprises an adapter detection unit that detects, via the auxiliary lens terminal, presence/absence of the intermediate adapter.

6. An exchangeable lens according to claim 1, wherein:
the auxiliary lens terminal assumes a shape substantially identical to at least one lens connector terminal among the twelve lens connector terminals.

7. An exchangeable lens according to claim 1, wherein:
the twelve lens connector terminals and the auxiliary lens terminal each include an exposed area that is exposed at a surface of the holding portion.

* * * * *